US008874781B2

(12) United States Patent
Khorashadi et al.

(10) Patent No.: US 8,874,781 B2
(45) Date of Patent: Oct. 28, 2014

(54) SYSTEM AND APPARATUS FOR POWER EFFICIENT DELIVERY OF SOCIAL NETWORK UPDATES TO A RECEIVER DEVICE IN A BROADCAST NETWORK

(75) Inventors: Behrooz Khorashadi, Santa Clara, CA (US); Saumitra M. Das, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 310 days.

(21) Appl. No.: 13/274,427

(22) Filed: Oct. 17, 2011

(65) Prior Publication Data

US 2013/0097236 A1 Apr. 18, 2013

(51) Int. Cl.
G06F 15/16 (2006.01)
H04H 60/25 (2008.01)
H04W 4/06 (2009.01)
G06F 17/30 (2006.01)
H04L 12/70 (2013.01)
H04L 12/18 (2006.01)
H04L 29/06 (2006.01)
H04L 5/00 (2006.01)
H04L 12/66 (2006.01)

(52) U.S. Cl.
CPC ........ *H04H 60/25* (2013.01); *H04L 2012/5641* (2013.01); *H04L 12/1845* (2013.01); *H04L 29/06163* (2013.01); *H04L 12/1895* (2013.01); *H04L 29/06455* (2013.01); *H04L 29/06088* (2013.01); *H04L 2012/5642* (2013.01); *H04L 5/00* (2013.01); *H04L 12/66* (2013.01); *H04W 4/06* (2013.01); *G06F 17/30864* (2013.01); *G06F 2216/05* (2013.01)
USPC ........... 709/232; 709/202; 709/203; 709/212; 709/217; 709/221; 709/235; 709/248; 717/168

(58) Field of Classification Search
USPC ........ 709/203, 212, 217, 220, 221, 232, 248; 717/168, 170, 171, 173
See application file for complete search history.

(56) References Cited

U.S. PATENT DOCUMENTS 6,748,416 B2 * 6/2004 Carpenter et al. ............ 709/202
7,493,294 B2 * 2/2009 Flinn et al. ...................... 706/12
(Continued)

FOREIGN PATENT DOCUMENTS

WO 2008072093 A2 6/2008
WO 2009082487 A1 7/2009

OTHER PUBLICATIONS

International Search Report and Written Opinion—PCT/US2012/060454—ISA/EPO—Jan. 8, 2008.

*Primary Examiner* — Michael Y Won
(74) *Attorney, Agent, or Firm* — Raphael Freiwirth

(57) ABSTRACT

Systems and methods for delivering social network updates from popular entities to receiver devices via broadcast or multicast networks obtain updates from highly popular entities. Updates may be assembled by a server crawling social network sites. To enable selective reception, the obtained updates may be broadcast/multicast according to a schedule that is communicated to receiver devices in advance, such as a catalog file. Receiver devices receive the catalog file and use the included information to selectively receive updates that are relevant to a user of the receiver device. Updates received from broadcasts or multicasts are cached in memory of the receiver device. When a user requests to access a particular social network entity on the receiver device, that request may be satisfied by accessing social network updates cached on the receiver device. Broadcasting and/or multicasting highly popular social network updates may relieve burdens on unicast networks.

55 Claims, 16 Drawing Sheets

(56) References Cited

U.S. PATENT DOCUMENTS

| | | | |
|---|---|---|---|
| 7,526,458 B2* | 4/2009 | Flinn et al. | 706/12 |
| 7,631,080 B2* | 12/2009 | Epstein et al. | 709/226 |
| 8,010,136 B2* | 8/2011 | MacDonald et al. | 455/466 |
| 8,015,119 B2* | 9/2011 | Buyukkokten et al. | 705/319 |
| 8,019,777 B2* | 9/2011 | Hauser | 707/769 |
| 8,352,346 B2* | 1/2013 | Carpenter et al. | 705/36 R |
| 8,370,396 B2* | 2/2013 | Blaxland et al. | 707/800 |
| 8,478,652 B2* | 7/2013 | Tuchman et al. | 705/26.1 |
| 8,560,554 B2* | 10/2013 | Gradin et al. | 707/748 |
| 2008/0177860 A1* | 7/2008 | Khedouri et al. | 709/217 |
| 2009/0144139 A1* | 6/2009 | Gaedcke | 705/14 |
| 2009/0150947 A1* | 6/2009 | Soderstrom | 725/93 |
| 2009/0276500 A1 | 11/2009 | Karmarkar | |
| 2010/0058375 A1 | 3/2010 | Lafreniere et al. | |
| 2010/0153213 A1 | 6/2010 | Pomplun et al. | |
| 2010/0177642 A1* | 7/2010 | Sebastian et al. | 370/248 |
| 2011/0022669 A1 | 1/2011 | Pascoe et al. | |
| 2011/0040718 A1 | 2/2011 | Tendjoukian et al. | |
| 2011/0040848 A1 | 2/2011 | Xu | |
| 2011/0078020 A1* | 3/2011 | Lajoie et al. | 705/14.53 |
| 2011/0225417 A1 | 9/2011 | Maharajh et al. | |
| 2012/0059825 A1* | 3/2012 | Fishman et al. | 707/737 |
| 2012/0095958 A1* | 4/2012 | Pereira et al. | 707/609 |
| 2013/0097236 A1* | 4/2013 | Khorashadi et al. | 709/204 |

* cited by examiner

SYSTEM AND APPARATUS FOR POWER EFFICIENT DELIVERY OF SOCIAL NETWORK UPDATES TO A RECEIVER DEVICE IN A BROADCAST NETWORK

TECHNICAL FIELD

The present application relates generally to communication systems, and more particularly to efficient methods and systems for delivering social network updates to computing devices via a broadcast network.

BACKGROUND

Wireless communication technologies have seen explosive growth over the past few years. This growth has been fueled by wireless services providing freedom of movement to the mobile public and cutting the tether to hardwired communication systems. As a result of service enhancements, the popularity of wireless services is expected to continue to grow rapidly.

A recent addition to wireless communication services has been the ability to view social network updates for friends and content on receiver devices using services like Twitter®, MySpace®, LinkedIn®, and Facebook®. Social network updates are posts made by a user using the social network that are viewable by other users. A problem in the art is that when highly popular users provide a status update, or "tweet," such as Lady Gaga®, millions of users may download the same tweet, posting or status update. This download may occur from multiple different social networks. This download may result in the creation of millions of service requests to a server and millions of responses to the request from computing devices.

For example, when entertainer Michael Jackson died on Jun. 25, 2009, the BBC reported that social network Twitter® servers crashed after users were updating their status to include the words "Michael Jackson" at a rate of 100,000 tweets per hour. Additionally, if Lady Gaga® or another highly popular user delivers multimedia data in a status update, or alternatively if a highly popular user provides a hyperlink to TwitPic® so a user can view an uploaded picture, such actions may result in millions of social network users requesting a large amount of data from a server, which can be burdensome to the communication networks carrying such traffic. This can be a particularly difficult problem for mobile communication networks which are already operating at near peak capacity, particularly at certain times of the day.

SUMMARY

The various embodiments include a method for broadcasting content in a mobile multimedia broadcast system that enables delivery of selected social media updates using the bandwidth available in broadcast networks. Embodiment methods include assembling a social network update into a content element package suitable for broadcast via a broadcast network, broadcasting a content description message describing the content element and identifying a time at which the content element package will be broadcast, and broadcasting the content element package at the identified time so that it can be received by receiver devices.

In another embodiment, a method for transmitting social network updates in a system includes encoding a data block for transmission that includes social network content elements, scheduling the data block for transmission according to a schedule during at least one transmission interval, and transmitting the encoded data block comprising the social network content elements at the at least one transmission interval.

In another embodiment, a method for delivering social network updates to a user includes determining a list of most popular identities among one or more social networking sites, downloading from the social network sites postings from those on the list of most popular identities, and caching the gathered postings on a plurality of servers located near an edge of a cellular network in a manner that enables responding to queries for such updates from receiver devices without burdening the rest of the communication network. The embodiment method may further include responding at the plurality of servers to requests from receiver devices for postings from the list of most popular identities rather than forwarding those requests on to the social network site. The method may also include a plurality of servers fetching data of the social network postings. The servers may periodically communicate with a server associated with the social networking site to obtain the social network postings in a systematic and automatic fashion.

In another embodiment, a method for delivering social network updates to a user includes determining a list of most popular identities among one or more social networking sites, downloading from the social network sites postings from those on the list of most popular identities, generating broadcast or multi-cast messages including the downloaded postings and an overhead package comprising broadcast scheduling information identifying when the postings will be broadcast or multi-cast, transmitting the overhead package and the broadcast or multi-cast of postings over a broadcast network to a plurality of receiver devices, and receiving the overhead package in at least one of the receiver devices. The method may further include comparing in the receiver devices the postings identities scheduled for broadcast contained in the overhead package with the user's personal list of identities, receiving from the broadcast or multi-cast those broadcast postings matching one or more of the user's personal list of identities, caching the received postings on the receiver device, and providing from cache the received postings to a social network application or in response to an access request on the receiver device from a social network application or a user input. In an embodiment, only the social network postings matching the user are cached. In another embodiment, different social network postings may be cached.

In another aspect, a method for efficiently transmitting social network updates in a system may include encoding a data block for transmission comprising a social network content element aggregated from a plurality of social network entities and scheduling the data block for transmission according to a schedule during at least one transmission interval. The method also includes transmitting the encoded data block comprising the social network content element at the at least one transmission interval.

The method may further include caching the encoded data block on a destination device to predict a request for the social network content element and transmitting in at least two data flows by transmitting a first encoded data block comprising a first social network content element at the at least one transmission interval for a first geographic location and transmitting a second encoded data block comprising a second social network content element at a second transmission interval for a second geographic location. In another embodiment, an agent may reside on a receiver device configured to monitor usage of a social network application at the receiver device and determine postings of interest at the receiver device based on the monitored usage.

The various embodiments include a multimedia broadcast network or multicast network including a transmission system and a server coupled to the broadcast transmission system, in which the server is configured with server-executable instructions to perform operations of the above described methods. In another embodiment, social network postings may be cached in proxy servers located near an edge of a network (e.g., a cellular data network), which are referred to herein as "edge servers." In another embodiment, social network postings may be broadcast on a network based on popularity. For example, a first geographic location, such as Los Angeles, may have different broadcast social network postings data stored in edge servers than a second geographic location, such as New York City, since the popularity of social network entities may be different in the first or second geographic location.

The various embodiments include a non-transitory processor-readable storage medium having stored thereon server instructions configured to cause a server to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
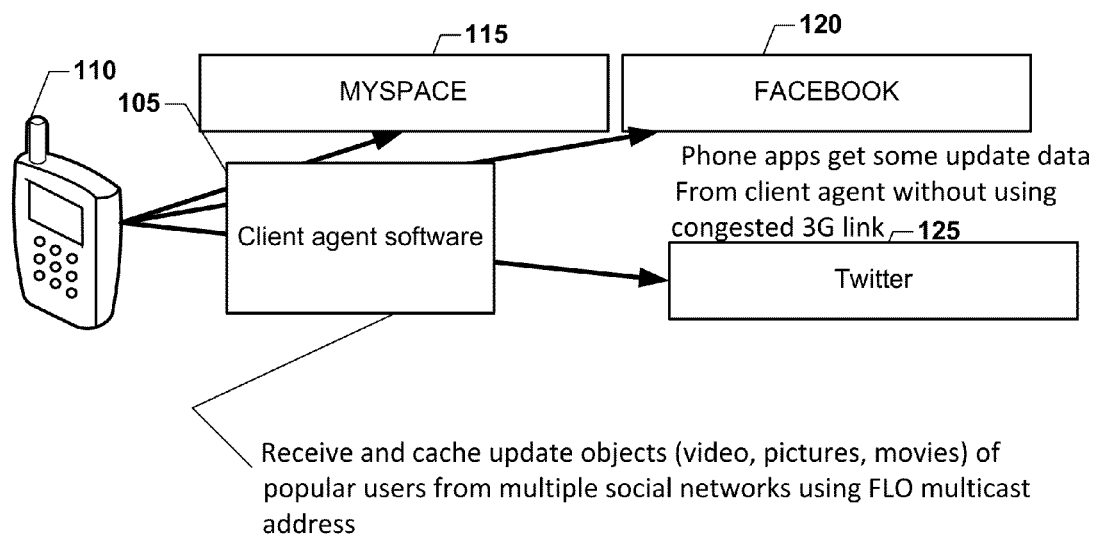
FIG. 1A illustrates a high level diagram of an embodiment of a mobile receiver device having a software agent application that receives and caches updated media objects via a broadcast or multicast communication network.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "receiver device" is used herein to refer to any one or all of smart phones, personal mobile television receivers, cellular telephones, automobile mobile television receivers, personal data assistants (PDA's), palm-top computers, wireless electronic mail receivers (e.g., the Blackberry® and Treo® devices), multimedia Internet enabled cellular telephones, and similar personal electronic devices which include a programmable processor, memory and broadcast or multicast receiver circuitry for receiving and processing broadcast or multicast transmissions. In another embodiment, the receiver device may be an accessory device that includes an agent that may assist a receiver device to receive data. For example, the receiver device may include a mobile phone accessory that includes an agent to assist a mobile phone with receiving broadcast data. It should be appreciated that the receiver device is in no way limited to a mobile device and may be any device that can receive broadcast data.

The term "social network" is used herein to refer generally to a software application or network service (e.g., a service delivered via the Internet) that organizes information (e.g., postings, updates, text, photos, "tweets", pages, etc.) according to a social structure made up of individuals (or organizations) called "nodes", which are tied (connected) by one or more specific types of interdependency, such as friendship, kinship, common interest, financial exchange, dislike, sexual relationships, relationships of beliefs, knowledge, commercial purposes, business purposes and/or prestige. Social networks may be embodied in a software application that views social relationships in terms of network theory consisting of nodes and ties (also called edges, links, or connections). Nodes are the individual actors or entities within the networks, and ties are the relationships between the actors or entities. For example, a Twitter® social network includes a social network user that follows certain individuals, corporations, topics, entities, businesses, sports teams, groups, fictional characters, or television programs. The user in kind also may have a set of followers that view the user's SMS status updates.

Social network applications enable complex data sharing structures which can model or take the place of interpersonal relationships and information sharing. For example, a Facebook® social network includes a number of friends that are invited to link to a user. Once linked, the user may view the status updates of friends while other user's postings may remain private. As another example, in a LinkedIn® social network, users may associate with networking contacts. Users may share data, objects, or attributes once linked and may send messages, view postings or view job related data.

Figure 3:
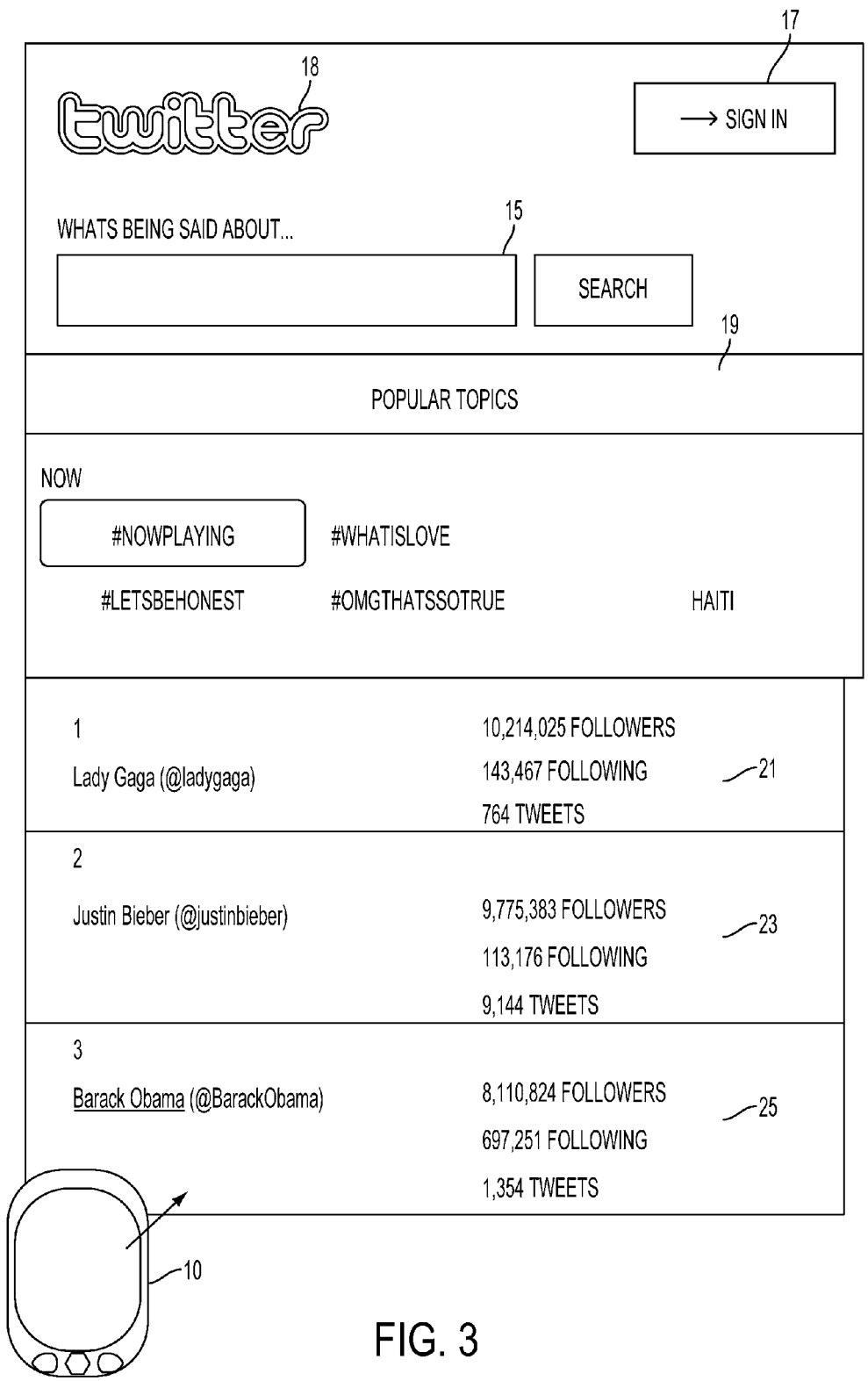
FIG. 3 is an example display of a social network application illustrating highly popular social network entities according to an embodiment.

In its simplest form, a social network is a software application that includes a map of specified ties, such as friendship, between the nodes. The nodes to which an individual is connected are the social contacts of that individual. These social networks can also serve as a database for information related to or generated by each node for communication to sharing with other nodes for which there is a tie. The social network can also be used to measure social capital or a value that an individual receives from the social network, such as the number of followers or friends. For example, some social network users may have ten friends while other users may have millions. These concepts are often displayed in a social network software display interface, where a social network user is displayed and a number of followers may be displayed below the social network user as shown in FIG. 3.

The term "broadcast" is used herein to mean the transmission of data (information packets) so that it can be received by a large number of receiving devices simultaneously (compared to "unicast" which is transmission of data to one specific computing device). A type of broadcast is known as multicast, an example of which is Internet Protocol (IP) multicast. References herein to broadcast are not intended to exclude multicast communication networks and protocols. Examples of a broadcast message are mobile television service broadcast signals, including content broadcasts (content flow) and overhead information broadcasts (overhead flow). IP multicast is a method of sending Internet Protocol (IP) datagrams to a group of interested receivers in a single transmission, instead of individually transmitting the messages to specific receivers. IP multicast may be used for streaming media applications on the Internet, and may use reserved multicast address blocks in IPv4 and IPv6.

The word "unicast" is used herein to refer to a wireless data transmission that is directed to a single receiver device. In contrast to a broadcast network, a "unicast network" refers to a wireless communication network that sends and receives transmissions to and from individual wireless communication devices. Examples of unicast networks that may be used with the various embodiments include cellular communication networks (e.g., third generation (3G), generation (4G) and Long Term Evolution (LTE) cellular data networks), Wi-Fi® networks, and Wi-Max® networks.

The word "web server" is used herein to refer to an application or group of applications capable of receiving a Hypertext Transfer Protocol (HTTP) request and returning an appropriate HTTP response, such as providing a Hypertext Markup Language (HTML) file. A web server may include middleware or an application portion, such as a J2EE® server, an ASP® server, a PHP module, a PERL interpreter, or similar functionality. A web server may also include a data storage portion, such as a database management system (DBMS) or local file store. A web server may be implemented within a conventional server, but in the various embodiments a web server may also be implemented within the operating system running on the processor of a receiver device, such as a smart phone or mobile computing device.

Social networks have become very popular due to their ability to connect people together who would otherwise never meet or have difficulty communicating. The Internet communication services provided by social networks have lead to their rapid adoption by entertainers, marketers, politicians, social activists and political activists. Consequently, social networks now have the capacity to place large demands on communication networks when social network postings are made by popular participants or regarding significant events. Updates from a highly popular entity or updates regarding highly popular topics may cause network problems in a traditional social network. This may occur when millions of users attempt to access the same status update nearly simultaneously. The result could be millions of server requests and server responses occurring within a short period of time, with the associated unicast networks having to carry the request and response transmissions. This may congest communication networks, such as a 3G cellular data communication network regionally and/or nationally. It should also be appreciated that social network updates are not limited to small text strings, and increasingly include high quality pictures and videos and other data intensive files which increase the network burden.

The various embodiments provide bandwidth efficient mechanisms for delivering social network update data to receiver devices via a broadcast and/or multicast network so that the social network data can be received and cached in the receiver device for prompt access by a local social media application. By broadcasting or multicasting social network updates that are of interest to many (e.g. millions) of users, a few broadcast transmissions can deliver update messages that otherwise would require thousands if not millions of unicast communication exchanges. In an embodiment, a receiver device may include an application or agent for selectively receiving social network broadcasts/multicasts to receive updates of interest to a user, and caching the updates in memory. The receiver device may further include a local Web server application running on the device processor and a social network software application, or software "App" that also runs on the device processor and that connects to the Web server to obtain social network updates which have been cached on the device, and may connect to a social network server via a communication network (e.g., a cellular communication network and the Internet) for social network updates that have not been cached. In another embodiment, the popular social media updates may be cached in a server positioned on an edge of the communication network (e.g., a server within a cellular communication network with a network connection close to wireless transceivers) so that requests for such social media updates from mobile receiver devices may be satisfied without the need for transmitting the request and replies deeper into the communication network.

The various embodiments may be particularly useful for delivering social network updates to receiver devices since a wireless broadcast or multicast network provides an efficient delivery mechanism for widely accessed content. Such social media content may include multimedia files, video, text, music, and other types of data files. Data files, such as social network updates, may originate from two or more different social networks, such as from Twitter® and Facebook®, which may be hosted on various networks and/or the Internet. In the various embodiments, popular social network updates (i.e., those that are likely to be accessed by a large number of individuals) may be aggregated and broadcast or multicast as disassembled elements via a broadcast or multicast network.

To enable reception by receiver devices, the disassembled elements may be scheduled for broadcast in a series of messages, with the messages broadcast according to the broadcast schedule which is communicated ahead of time in a schedule broadcast (e.g., an overhead content description flow), such as an electronic catalog. Receiver devices may receive the overhead content description flow and use the schedule information to selectively receive the disassembled webpage and/or social media update content for storage (i.e., caching) in the receiver device memory. When a receiver device user requests access to a social network application, such as by opening a local Twitter® or Facebook® application, the application operating in the receiver device may access a local Web server operating on the same receiver device, which may reply to the request much like a standard social media server by assembling the requested file (e.g., status update) from the previously received and cached update files. The requested social media update file may be passed to the requesting social media application. The local application then uses the status update (such as to display the updated user) as if the requested social media update file had been downloaded directly from a network connection. The local social network application may combine elements received from both broadcast and unicast networks and present the status updates to the user in a seamless manner. For example, the social network application may obtain the latest updates from cached files received via the broadcast network and obtain older postings via the unicast network in a conventional manner. It should be appreciated that this non-limiting example is just one embodiment of the present disclosure of a local server providing the social network posting information. In an alternative embodiment, social network posting data may be provided by a software process that supports the same application programming interface (API) as the origin social network server.

In order to identify social media updates that will be of interest to sufficient numbers of broadcast/multicast receivers to justify the use of broadcast networks, a network server may periodically crawl social networks to identify highly popular social network entities, such as individuals with a very large number of subscribers or "friends." The server may review social network data and identify an arbitrary number of highly popular social network entities, such as the top 100 most popular entities. For example, as of the filing date of this application Lady Gaga, President Barack Obama, Amazon. com and Charlie Sheen might be identified as entities having a very large number of social network followers or entities that receive their web posts.

A server configured to implement the various methods may identify highly popular social network entities and highly popular social network topics based upon whether the number of ties or network linkages exceeds a threshold number. This threshold number may be established based upon network considerations, such as whether the net costs of satisfying unicast requests for updates from those individuals exceeds the cost of assembling and broadcasting or multicasting the updates via the various embodiments.

For example, in one embodiment, a first determination of a cost on the telecommunication network may be made if the social network update file was delivered in a conventional manner. The server may also make a second determination of a cost to use the broadcast or unicast transmission of the social network update file. The server may review the cost determinations and form a determination as to whether to transmit the social network update file in a conventional manner (i.e., in response to specific requests via a unicast network) or via broadcast. For example, broadcasting a social network update file may not be optimal for a relatively small number of users, but may be very economical for 10,000 users. In another embodiment, the method may foresee a large uptick in social network traffic associated with a particular individual or news event and then switch to broadcasting related social network updates. For example, 100,000 tweet accesses per hour may be a critical value at which the costs to broadcast are offset by the savings unicast network expenses or bandwidth problems. Further, the embodiments may determine when the popularity of individuals or subject matter has diminished to the point that broadcast/multicast delivery of updates no longer makes sense from a network utilization and/or cost perspective, and cease broadcasting/multicasting of such updates.

A server implementing an embodiment method may crawl the various social networks to gather popularity statistics (e.g., number of user accesses/requests per unit of time, such as hour, day or week), analyze this information to identify the most popular entities and topics, and then obtain the social network updates of the highly popular social network entities/topics. The server may aggregate those obtained updates for delivery via IP multicast or broadcast methods. In an embodiment, in addition to or instead of broadcasting/multicasting obtained popular social network updates, the obtained data may be cached in servers positioned on an edge of cellular communication networks to enable requests for such data to be answered without requiring communications deeper into the cellular and data networks. In an alternative embodiment, instead of or in addition to the server crawling social networks, the server may implement a special application programming interface (API) between the server and the origin social network server that identifies or returns a predetermined number K of social network nodes and their list of friends, along with optional location information about the nodes. Various social network posting identification configurations are possible and within the scope of the present disclosure.

In an embodiment, an agent on the receiver device may include subscription information or a list of followers, entities or a list of topics that the user is interested in following in one or more social networks. The agent may determine if there is a match between the list of followers of the user and entities associated with the broadcast. In an embodiment, the agent may view a broadcast content description message flow that is routinely transmitted by a broadcast/multicast network to determine if there is a match to a user's social media connection or "friend." If there is a match, the agent may signal or otherwise control the device's broadcast or multicast receiver circuitry to receive and store the status updates of only those matching entities (data or topics), ignoring broadcasts/multicasts of other entities or topic updates.

In an embodiment, the user may specify subscription parameters to the agent operating on the user's receiver device. In another embodiment, the agent may access subscription parameters from a local social network application on the user's receiver device, or the social network itself, to determine subscription parameters. In another embodiment, the agent may monitor usage of the social network by the receiver device user to infer the subscription parameters or social media updates that the user is likely to be interested in receiving. In another embodiment, the user may receive subscription parameters from another entity, such as the user may adopt a second entity or a friend's subscription parameters. Such subscription parameters may be used by the agent to identify social media broadcasts/multicasts to be received and cached on the receiver device.

In another embodiment, a daemon software application operable on a receiver device may be provided that operates in the background. In UNIX and other computer multitasking operating systems, a daemon is a computer program that runs in the background, rather than under the direct control of a user. The daemon software program may be initiated as a background process and may handle the system log, or SSHD, which handles incoming SSH connections. The daemon software application may access a social network software application operating on the receiver device to obtain the subscription parameters, such as a list of followers or friends that the user is interested in following in one or more social networks. The daemon software application may determine if there is a match between the list of followers, or topics, or entities associated with a broadcast or multicast, such as by analyzing the information in the network's overhead transmissions or electronic catalog or directory. If there a match identified, the daemon software application may direct or otherwise control the broadcast/multicast receiver circuitry to receive the status updates of the entities of interest and ignore broadcasts/multicasts of other entities or topics. In another embodiment, the social network software application may be run or executed from a server instead of the mobile receiver device, and the daemon software application may access the social network software application from the server using a browser.

In another embodiment, the broadcast may be transmitted via IP multicast using a specific predetermined multicast address so receiver devices can receive the status updates that are of most relevance to their users. In another embodiment, the updates from the social network may not be associated with followers or the receiver device but instead may relate to topics. For example, a user of the receiver device may wish to receive topical data regarding certain social network comments or tweets about restaurants in a particular geographic area, or about a particular movie.

In another embodiment, broadcasts of aggregated social media content may vary by geographical location. The most popular social network entities may vary between cities and geographical regions. For example, in Pittsburgh, Pa., certain local Pittsburgh sports figures may be very popular social media entities among the social network users in that region, while those same social media entities may be of little interest to social network users in New York, N.Y. Therefore, the process of identifying the most popular social media entities may be performed on a geographic basis with aggregations of social media updates for broadcast or multicast differing from one region to another. For example, rich media content in the form of a first aggregation of social network status updates may be delivered in a first broadcast flow to a first geographical location while a second aggregation of social network status updates may be delivered in a second broadcast flow to a second geographical location that is different from the first.

Most mobile receiver devices have limited memory, so to make room for new social media updates in the cache memory, embodiment methods may provide mechanisms for deleting stale updates in order to make room for fresh updates. In an embodiment, the receiver device may monitor usage of social networks to identify those most often accessed by the user. For example, the user may access Twitter® four times as often as another second social network (e.g., Facebook®). The receiver device may aggregate one or more statistics of social network use to select files for deletion. The receiver device may delete cached data associated with a less frequently used social network over other more frequently used social networks. Thus, when the social media update cache memory has reached a limit, stale data associated with less frequently accessed social networks may be deleted to make room for new updates from more frequently accessed social networks.

In another embodiment, some update data may be repeated more frequently by a base station using the broadcast flow than other broadcast data associated with social network updates. For example, social network updates for highly popular users may be broadcast much more frequently than the updates of others, and the broadcast updates may be repeated in a more frequent manner by a base station in the broadcast flow.

In another embodiment, the broadcast network may transmit status updates from a server that is different from the server operating the social network application. For example, aggregated status update data may be transmitted from a proxy server to the mobile receiver device in a broadcast configuration. In this embodiment, a server may crawl various social networks and review data of the social networks to determine a number of highly popular social network entities. The server may aggregate the highly popular entities and supply the data to another second server or computing device. The second server may package the aggregated social updates and transmit the data to the receiver devices where the aggregated social updates from the social networks may be stored in a cache memory. A first server may identify highly popular social network entities and a second server may transmit the social network updates in a highly accurate and cost effective manner using broadcast and/or multicast networks.

In another embodiment, the social updates may be selected by some predefined social network update hierarchy. For example, social network update hierarchy may include a methodology wherein highly popular entities depend on the receiver device user and who the receiver device user's friends are, and from whom the receiver user frequently accesses or receives status updates. For example, a user of the receiver device may have friends who follow status updates postings from highly popular entities. Even though the receiver device user has not selected the highly popular entities, due to the user's social network hierarchy, the user's receiver device may be configured to receive status update postings from broadcast or multicast transmissions based on the user's affiliation with a friend.

For example, a first individual may follow a highly popular celebrity. A second individual may frequently communicate with the first individual and exchange messages. Based on this social network hierarchy between the first and second individuals, the second individual's receiver device may decide to receive broadcast data from the highly popular celebrity given that since the first and the second individual communicate frequently and thus it is likely they will communicate about the highly popular celebrity.

In yet another embodiment, the server may detect that in a relatively short interval a large number of social network users are viewing, accessing or reviewing files associated with a newsworthy event or newsworthy topic. The method may predict that certain other social network users may wish to view the newsworthy event in the future given that a large number of individuals are viewing the topic and the list of viewers is growing. The method may deliver social network updates to the user via a broadcast network and a user's receiver device may receive such updates without any subscription parameter and cache the social network update in memory of the receiver device.

The various embodiments have a wide variety of potential applications for delivering rich media content social network updates to receiver devices via a broadcast or multicast network. The large bandwidth of broadcast networks can be leveraged to transmit large media content files to receiver devices. By accomplishing the assembly of rich media content into a form that can be utilized by a local application within the receiver device, the delivery of rich media content in the form of broadcast content elements can more efficiently utilize the available communication bandwidth and enable receiver devices to conserve battery power.

For ease of reference, the various embodiments are described below using the example application of social network content delivery. This application illustrates functioning of the various embodiments using common terminology. However, the following descriptions are not intended to limit the embodiments to social network update delivery. One having ordinary skill in the art would appreciate that the various embodiments may also be used for delivering a variety of rich media content. Accordingly, the scope of the claims should not be limited to social network update delivery and reception unless specifically recited.

A number of different mobile broadcast television services and broadcast standards are available or contemplated in the future, all of which may implement and benefit from the various embodiments. Such services and standards include, e.g., Open Mobile Alliance Mobile Broadcast Services Enabler Suite (OMA BCAST), MediaFLO, Digital Video Broadcast IP Datacasting (DVB-IPDC), Digital Video Broadcasting-Handheld (DVB-H), Digital Video Broadcasting-Satellite services to Handhelds (DVB-SH), Digital Video Broadcasting-Handheld 2 (DVB-H2), Advanced Television Systems Committee-Mobile/Handheld (ATSC-M/H), and China Multimedia Mobile Broadcasting (CMMB).

Social network updates may be suitable for distribution over a broadcast wireless network since a large portion of common web page requests are directed to a relatively small number of highly popular entities. For example, popular social network participants may tweet text, and provide a link to a photo using Twitpic® to millions of users. This content is frequently accessed as any and all followers have the ability to request this information and have the social network update data delivered to the receiver devices. The various embodiments use broadcast wireless networks and multicast networks to enable the social network update content to be broadcast efficiently in terms of bandwidth utilization and receiver device battery power consumption while providing users with near-instant access to the popular social network updates.

FIG. 1A illustrates a high level schematic diagram of an embodiment of a client agent software application 105 (or agent) operating on a receiver device 110. The client agent software application 105 may receive and cache update objects of highly popular social network entities from multiple social networks using a multicast address. The client agent software application 105 preferably resides on the memory of the receiver device 110. The client agent software application 105 alternatively may reside on a server and may communication with the receiver device 110. In a further embodiment, the client agent software application 105 may be hardware or software and optionally may reside on a peer device. The client agent software application 105 may receive the broadcast status updates at a receiver device from a number of different social networks 115, 120 and 125 via a broadcast or multicast communication network to avoid using a congested communication link to receive such updates. In an embodiment, the client agent software application 105 may also reside on an external device. For example, the external device may be a Mophie® Juice Pack® device with FLO TV®, or a set top box for a cable or satellite TV network. The client agent software application 105 may also optionally review a content description message for identifying information pertaining to whether the broadcast content matches subscription information of the receiver device user. In another embodiment, the client agent software application 105 may forward postings to another second user.

A broadcast network provider, working with a small number of popular social network providers (for example, Facebook®, Twitter®, Linkedin®, Myspace®, Foursquare®, etc), can provide a variety of social network content using the efficient website data delivery mechanisms of the various embodiments. A broadcast network, such as a mobile television broadcast network, can efficiently deliver the web content according to the various embodiments to an unlimited number of users. When a receiver device user accesses a broadcast social network (e.g., by entering in a username and password, and accessing the social network website), the web server functioning within the receiver device may rapidly generate the status updates from highly popular entities stored in cache memory without delays associated with requesting and receiving the web page from a remote server via communication networks. If a user accesses a social network to request display of an entity status update that is not highly popular and that is not broadcast according to the embodiments, the user's receiver device may obtain the requested status update from a server associated with the social network in the conventional manner.

In the various embodiments, the receiver device may automatically monitor the broadcast network for scheduled broadcasts of social network updates of highly popular social network entities. These may include social network entities that include a large number of followers, for example over 50,000 followers. The receiver device may selectively receive and store social network update elements that the user is interested in receiving. In some embodiments the receiver device may include logic to avoid receiving broadcasts of stale or previously received status updates. In some embodiments the receiver device may be further configured to erase aged status updates from the cache since a user may only like to review current information, a well as to make room for cache new updates.

In an embodiment, the selective reception of social network updates, managing files in cache and satisfying requests for social media postings from users and applications may be accomplished in the background by a daemon software application operating on the receiver device processor. When a user of the receiver device enters a command to view a particular social network entity (e.g., by entering the user's name or selecting the corresponding URL, or clicking a graphical user interface in a social network application), the web server application within the receiver device may assemble the requested updates and present it to a standard browser or other social network application already loaded on the receiver device (e.g., a widget).

The presented social network update may be dynamic and interactive, and have the same look-and-feel as the regular social network content downloaded from the Internet via a unicast wireless network. Since the social network updates are locally stored in a cache memory on the receiver device, the requested webpage may be assembled by an agent application or Web server application on the receiver device and displayed very rapidly. In another embodiment, the social network update may be stored in a cache in a native format, such as in binary format. Thus, from the receiver device user's perspective, the receiver device appears to have very high-speed Internet access capability for social network updates that were previously received from a broadcast or multicast network and cached as disassembled social network update elements. This may provide a significant improvement in the user experience over traditional mobile web browsers, since web pages typically take 20 seconds or more to download over a 3G link, which is in addition to any server delays. Additionally, a network server does not need to respond to millions of different requests for the same data once a highly popular social network entity posts an update when that update is transmitted to receiver devices via a broadcast or multicast.

Figure 1B:
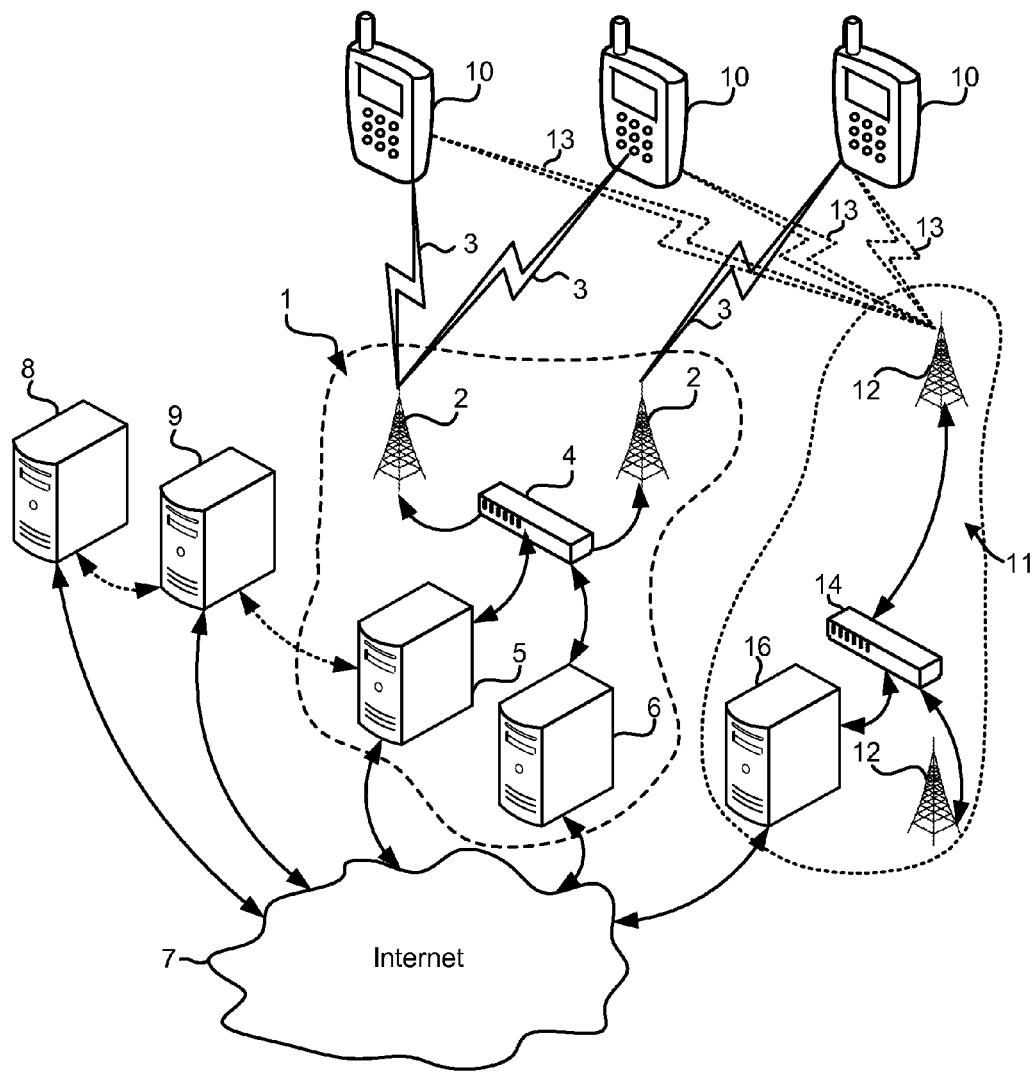
FIG. 1B is a communication system block diagram illustrating a mobile multimedia broadcast communication system suitable for use in an embodiment.

The various embodiments may be implemented within a variety of mobile multi-media broadcast and multicast systems, an example of which is illustrated in FIG. 1B. A mobile multimedia broadcast network 1 typically includes a plurality of broadcast transmitters 2 controlled by a mobile broadcast network control center which is referred to herein as a broadcast operation center 4 (or "BOC" in the figures). The mobile multimedia broadcast network 1 broadcasts content from the broadcast transmitters 2 as mobile broadcast transmissions 3 for reception by receiver devices 10, such as mobile television receivers, smart phones, cellular phones, personal digital assistants (PDA), tablet computers, interactive game devices, notebooks, smartbooks, netbooks, data processing apparatus, tablet computers, accessories or other such electronic devices. Within the mobile broadcast network control center 4 will typically be one or more servers 6 which may be configured to manage the scheduling of content broadcasts, generation of electronic service guides and catalog messages regarding the content broadcasts, and generation of metadata messages for broadcast via the overhead flow of the mobile multimedia broadcast network 1.

One or more servers 6 may also include connections to an external network, such as the Internet 7, through which the server 6 may receive status updates and content feeds from social network content provider servers 8. One or more servers 6 may be configured to receive content from social network content provider servers 8, determine information about the received content to be included in metadata, determine a schedule for broadcast of the content in content batches, and generate an electronic service guide, catalogs of content broadcasts, and other overhead messages (or flows) for broadcast to receiver devices 10. The social network content provider servers 8 may provide access to a social network software application and allow a user to access the social network software application, such as by using a username and a password. Once access is granted, a user of the receiver device may access the social network software application using the receiver device 10 to view social network updates, to view friends, to view pictures, etc. In various embodiments, the social network may be any type and brand of social network, some examples of which include Facebook®, Twitter®, Foursquare®, LinkedIn®, MySpace®, Delicious®, Flickr®, Friendster®, Google® Buzz®, Orkut®, and Yelp®. Generally, entities post social network update files on their servers or networks, which may be received by the receiver device 10 user, which is also referred to as a social network follower. The social network entity may be an individual, a business or an organization, and highly popular entities are those with sufficient followers or popularity such that requests for an transmissions of their updates may strain a communication network. The receiver device 10 user also may post social network updates, which the social network may store so that they can be received by a second follower.

As part of this content delivery system, the mobile multimedia broadcast network 1 may also include a web content server 5 for managing webpage content elements for broadcast via the mobile broadcast network 1 according to the various embodiments. The web content server 5 may receive webpage content elements, such as text files, images, graphics, CSS files, JavaScript® files, JPEG media files, Flash® media files, and templates, from a social network content provider server 8, or a social network hosting server 9, either via a direct network connection or an indirect network connection, such as the Internet 7. In the various embodiments, the web content server 5 may receive social media update data from several social network content provider servers 8 and social network hosting servers 9. In some implementations, the web content server 5 may periodically access social network content provider servers 8 and social network hosting servers 9 to download status and posting updates. In some implementations the social network hosting servers 9 may periodically push social media update content elements to the web content server 5. In some implementations, the web content server 5 may receive updated webpage content elements both by accessing websites and by receiving content pushed to it by social network content provider servers 8 and social network hosting servers 9. The generation of web content in the social network content provider servers 8 and social network hosting servers 9 may be accomplished in the ordinary manner that social media website content is generated and hosted.

In addition to the mobile multimedia broadcast network 1, receiver devices 10 may also be configured for duplex communication via a unicast network 11, such as a 3G cellular telephone network or a Wi-Fi® wireless network (e.g., a Wi-Fi® "hotspot"). A typical cellular telephone network includes a plurality of cellular base stations 12 coupled to a network operations center 14, which operates to connect voice and data calls between receiver devices 10 and other network destinations, such as via telephone land lines (e.g., a POTS network, not shown) and the Internet 7. Communications between receiver devices 10 and the unicast network 11 may be accomplished via two-way wireless communication links 13, such as 3G, 4G, CDMA, TDMA, and other cellular telephone communication technologies, as well as wireless wide area network such as Wi-Fi®, Wi-Max®, etc. To facilitate Internet data communications, the unicast network 11 alone will typically include one or more servers 16 coupled to or within the network operations center 14 that provide a connection to the Internet 7. Receiver devices 10 may communicate with the mobile multimedia broadcast network 1 via the unicast network 11, such as via an IP data call to a broadcast network server 6 by way of the Internet 7, such as for purposes of subscribing to social media broadcast services (e.g., subscribing to broadcast web services). Additionally, receiver device users can access the Internet 7 via the unicast network 11, such as to download social network updates that are not broadcast per one of the various embodiments.

Figure 2:
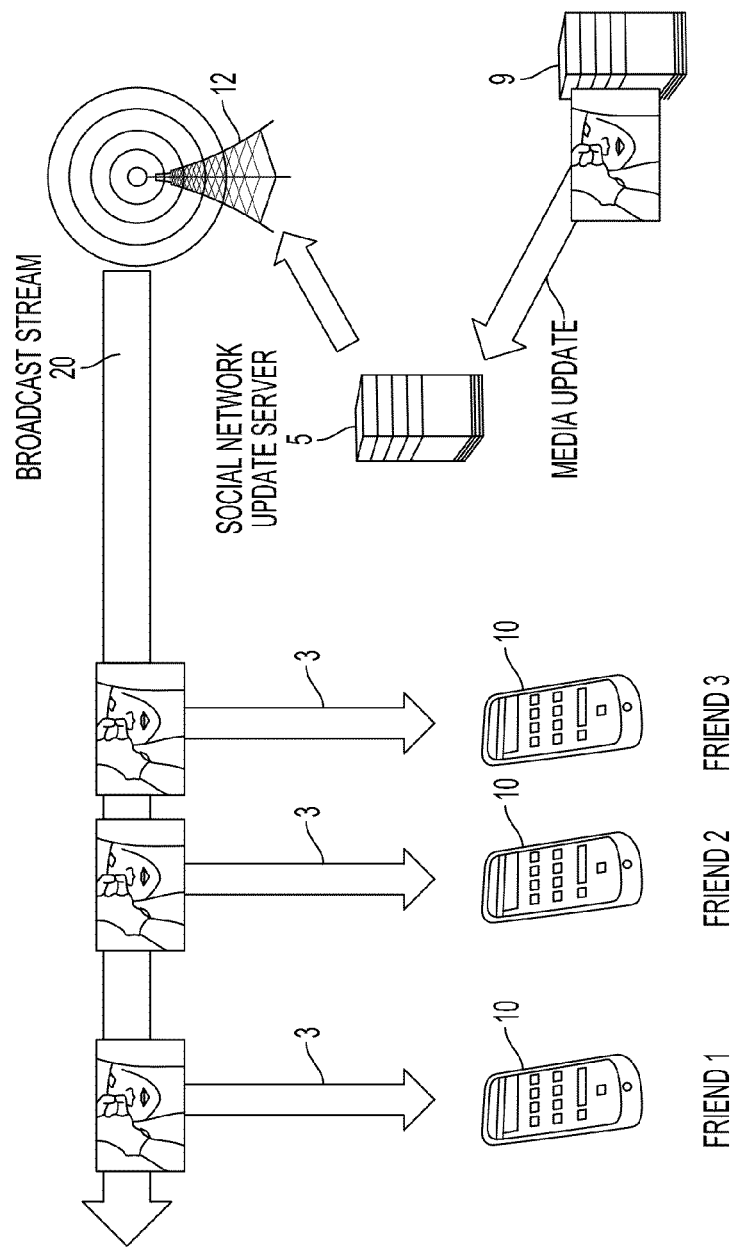
FIG. 2 is a high level illustration of a number of social network updates obtained from a social network server that are broadcast to mobile receiver devices and illustrating how social network content elements may be broadcast and received on the mobile receiver devices.

A high level diagram of operations of the various embodiments is shown in FIG. 2. As shown, the broadcast network may include a social network (or social media) update server 5, which may be a web content server 5 or a different server 6 discussed above with respect to FIG. 1B. Within the mobile broadcast network control center 4 will typically be one or more servers 5 which may be configured to manage the scheduling of content broadcasts, generation of electronic service guides and catalog messages regarding the content broadcasts, and generation of metadata messages for broadcast via the overhead flow of the mobile multimedia broadcast network 1. As shown, the social network update server 5 is connected to the one or more social network hosting servers 9. The social network hosting servers 9 stores the social media updates and is configured to respond to Internet messages in order to provide social network updates to a plurality of users or followers, such as to their respective receiver devices 10. Other servers may also be involved with distribution of social media updates.

In the normal operation of the social media network, the highly popular social network entity periodically uploads a media update, which may comprise text, video, media, JPEG pictures, a music album, a movie, or any other data. In the various embodiments, the media update may be communicated to the social network update server 5 which may assemble the social network update for broadcast or multicast. Prior to broadcasting the multicasting the social network update, the social network update server 5 may communicate a schedule of the social network update broadcast or multicast, which may be transmitted in an overhead package on a broadcast/multicast stream 20 (e.g., an electronic catalog or schedule announcement), which is delivered to each mobile receiver device 10 tuned into the broadcast/multicast network via the overhead package (e.g., as broadcast transmissions 3). Then, at the scheduled times announced in the previously transmitted overhead package, the assembled social network updates are broadcast or multicast over the broadcast/multicast stream 20. Each mobile receiver device 10 having previously received the overhead package determines when to tune into the broadcast/multicast stream 20 at the appropriate time and the appropriate channel or stream in order to receive social network updates for the "friends" or subscribed entities designated by the device's user. As selected social network updates are received, the receiver device 10 stores the update data in a cache memory. Thereafter, when a user executes a social network application on the receiver device 10 and selects a highly popular entity to which they have subscribed or friended, the social network updates associated with that highly popular entity are already stored in the cache memory, and can be displayed on the receiver device 10 very quickly.

The social network update data transmitted to receiver devices 10 may include any data capable of being viewed or executed by a web browser or a social network application. A social network update is often a single HTML formatted file, but may be a single file of another format such as XML, JavaScript®, JPEG, MPEG, Flash® or PDF® or it may be a file, such as an HTML file, that relies on additional files. For example, a social network update may comprise an HTML file, one or more CSS and JavaScript® files, one or more JPEG media files and one or more Flash® media files, all of which are required to provide complete social network update display on the receiver device. A social network update may be static or dynamically generated. A static social network update is generally a web page that is stored on the website hosting server in the same format as it is delivered to the end user. However, the most popular content may be dynamically generated.

FIG. 3 illustrates a screen shot of an exemplary display that may be displayed on a receiver device 10, which presents nearly one example of a social network site and is not intended to be limiting. The illustrated display is from a Twitter® social network application 18 and includes a search tab icon 15 where a user may type using an input device (not shown but may be the display itself in a touch screen equipped receiver device) to select one or more followers, one or more social network users, or one or more topics for discussion and viewing. In this example, the display forms a graphical user interface or "GUI" and may be a touch screen display where one or more icons form hyperlinks to one or more webpages that can be displayed on the display. The example display includes a "sign in" icon 17 where a user may input a Twitter user name and a password for accessing the social network application 18.

The display may also include a number of popular twitter social network topics that form a number of hyperlinks to postings regarding the social network topic. For example, an illustrated popular topic 19 is "Haiti". The various embodiments enable a broadcast and multicast networks to transmit messages related to highly popular topics to millions of social network users in addition to individual highly popular entity status updates. It should be appreciated that the present disclosure is not limited to status updates for social network entities and may be applicable to topics.

Also displayed on the example GUI are a number of highly popular Twitter entities 21-25. For example, a Lady Gaga entity 21 having a Twitter address of (@ladygaga) includes over ten million Twitter followers while a Justin Bieber entity 23 (@justinbieber) includes over nine million followers and a President Barack Obama entity 25 (@BarackObama) includes over eight million followers. The highly popular social network entities may also follow others in the social network, which also may be highly popular and a number of tweets or social network updates may be aggregated. For example, the display shows that Lady Gaga has 764 tweets while Justin Bieber has 9,144 tweets or social network updates. The receiver device user may click on the GUI to view the tweets of the Lady Gaga entity 21 or may click on the hyper link "764 Tweets" to view all of the tweets associated with the highly popular entity 21, or may click on the "143, 467 following" hyperlink to view which entities the Lady Gaga entity 21 is following. In another embodiment, an advertisement that has multimedia may also be posted on a lateral side of the display, which further may increase the amount of data. The illustrated display and the description of how this GUI operates is for example purposes only for explaining how mobile receiver devices may interact with social networks.

Figure 4:
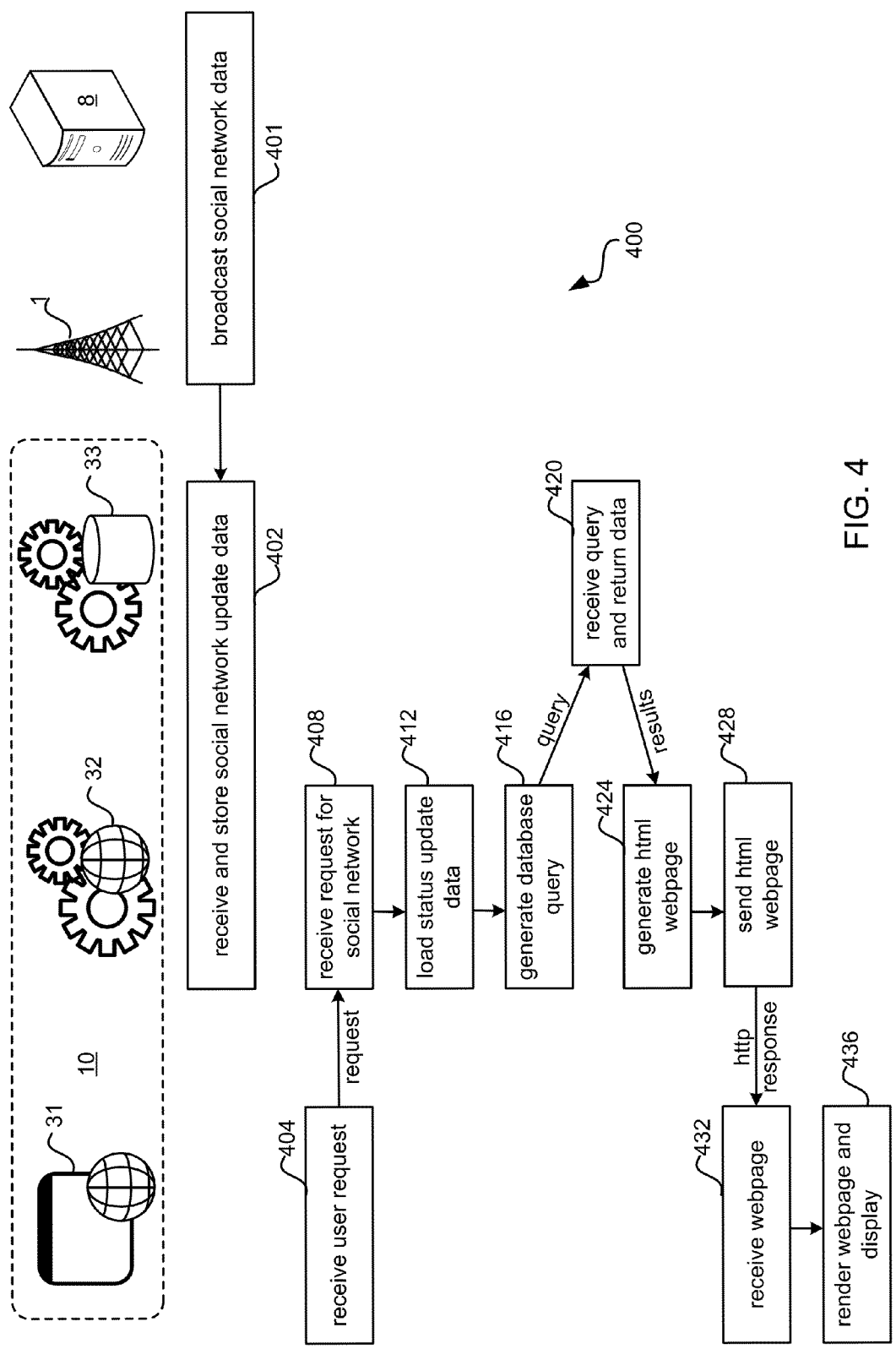
FIG. 4 is a communication flow diagram illustrating communications and processes for enabling access to broadcast social network updates according to an embodiment.

The various embodiments receive selected social content updates from a broadcast or multicast network, store the received data in local memory, and assemble the social network updates within an application (e.g., a web server application referred to herein as a local web server 32) hosted within the receiver device 10, such as illustrated is an embodiment method 400 in FIG. 4. Method 400 is an embodiment method for generating social content updates in a receiver device using broadcast or multicast social content update elements, which illustrates both process steps and message exchanges among the various functional components and the broadcast/multicast communication network. In an embodiment, the receiver device 10 may be configured with a local web server 32 and a local data store 33 to provide the receiver device 10 user with broadcast or multicast social network updates. The social network content provider server 8 may broadcast in block 401, via the mobile multimedia broadcast network 1 or a multicast network, social network status update elements as described above. The elements may comprise the data required to generate a social network update, which are selectively received and stored by the receiver device 10 in block 402. Methods for broadcasting and selectively receiving social network update elements are described in more detail below.

A processor within the receiver device 10 may be configured with application software including a web browser 31 or a social network application (not shown separately) and a local web server 32, which may be coupled to a local data store 33. Sometime after receiving social network update data elements in block 402, the web browser 31 operating within the receiver device 10 may receive a receiver device 10 user's request for a social network page in block 404, such as from the receiver device 10 user entering a website name (e.g., "Twitter.com"), selecting a website from a list or menu, or activating a hyperlink within a displayed document, or by running an application that is preloaded on the receiver device, for example, a Facebook® or Twitter® application for an Apple® I-Phone® or for a Blackberry® receiver device.

In response, the web browser 31 or a social network application may generate an HTTP (or other protocol) request, which the receiver device processor may send to the local web server 32 via an internal data bus or software relay. In some implementations, the web site hosted by the "local" web server 32 will have a "local" URL. In such implementations, a program for the local site on the local web server 32 may inform the receiver device 10 of the appropriate remote site that should be contacted. In some implementations, the URL for the remote server that should be contacted to receive content via the unicast network may be included within the program for the website. The URL may also be included in the information regarding webpage content that is transmitted as part of the overhead information. In some implementations the local web server 32 may recognize URLs for external servers (i.e., non-local URLs) in hyperlinks or in data request messages (e.g., via a table look up routine) as corresponding to locally cached social network updates, and direct the query to the locally cached data rather than forwarding the request on to the addressed server. The local web server 32 may receive the request for a social network in block 408, and load the appropriate program and social network status update data in block 412. The local web server 32 may process cached files to generate the requested webpage, or generate a database query, such as an SQL query, in block 416. The database query in the form of a database query protocol (e.g., JDBC) may be sent over a data bus or a software relay to the local data store 33 within the receiver device 10, which receives the query and returns the appropriate data in block 420. The local web server 32 may receive the results and generate the social network webpage based on the social network updates and using the local data in block 424. The local web server 32 may send the generated HTML webpage to the web browser 31 or a social network application in block 428. The web browser 31 or social network application may receive the webpage via an HTTP response in block 432, and render the webpage or display in block 436. If the rendering of the webpage or display requires accessing objects stored in the local data store 33, the web browser 31 or social network application may send requests for the required objects to the database and receive the requested objects as part of block 436.

The various embodiments may utilize a web browser 31 or a social network application, a local web server 32, and a local data store 33 to dynamically generate social network updates displayed either in a web browser or a social network application, as shown in FIG. 4. However, the various process steps may be accomplished by any combination of applications. In an embodiment, the functions of the web browser 31 or social network application, the local web server 32 and the local data store 33 may be performed by a single social network software application. In a further embodiment, the local data store 33 and local web server 32 may be a single application. Additionally, the web browser 31 may be a web browser capable of downloading and rendering Internet web pages, or it may be an application limited to interfacing with the local web server 32.

Web pages may also be assembled by a program running on the local web server 32 on the receiver device 10 to generate web pages according to logic implemented in the program. Such programs may be preloaded on the receiver device 10 or received via periodic transmissions by the broadcast network, from a unicast network, or via a software upload, such as from a processor-readable storage medium. Such programs for particular webpages may include an address of a remote server which may be contacted via a network. This address of the remote server may be different from the web flow identifier and the Internet URL for the website.

Figure 5:
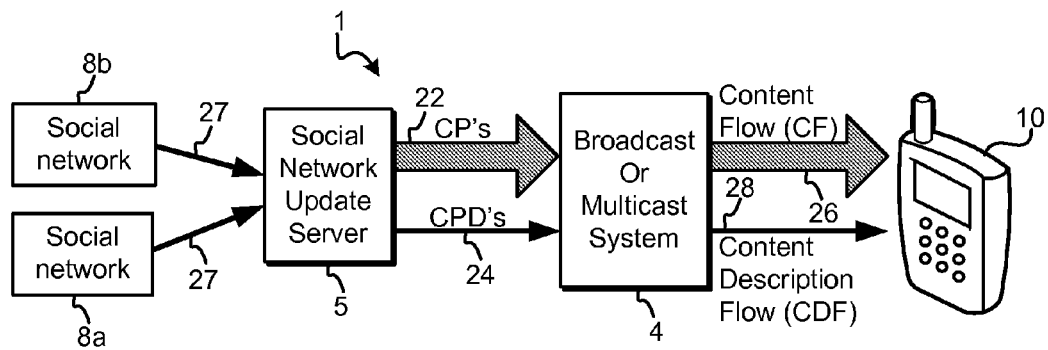
FIG. 5 is a communication system block diagram of a mobile multimedia broadcast system illustrating social network content delivery to receiver devices via a first content flow (CF) and via a second content description flow (CDF).

To broadcast webpage content elements to receiver devices, the various embodiments may utilize methods similar to how other content is broadcast to mobile receiver devices in a mobile multimedia broadcast network. FIG. 5 illustrates an overview of information flows within a mobile multimedia broadcast network 1 that may be used for delivering social network update elements to receiver devices 10 in broadcast transmissions. As mentioned above, a mobile multimedia broadcast network 1 may receive social network update content elements (e.g., text, photos, web templates or programs, graphics, images, dynamic data and executable scripts) from a number of social network servers 8a, 8b. In another embodiment, other servers may provide, or may assist with providing the social network content, such as by crawling multiple social network servers to assemble a central store of the most popular social network updates.

Such content may be provided to a social network update server 5 within a mobile multimedia broadcast network 1 via data networks (e.g., the Internet 7) via transmissions 27. The social network update server 5 may store such content in a database and schedule the content for broadcast. In scheduling social network update content for broadcast, the content manager server (or social network update server 5) determines what will be broadcast when and on which network address. As part of scheduling, the social network update server 5 may format the update content elements into content packages (CPs) suitable for broadcast. The social network update server 5 can also extract information about the social network update elements for inclusion in content describing and scheduling overhead messages (referred to as content package description flow (DCF) and content package descriptions in the figures). The extracted information regarding the social network update elements may include, for example, the corresponding social network name (or other identifier), social network entity name, update text, local or remote URL, object identifier or file name, version number, media type (e.g., text, PDF, JPEG, FLASH, JavaScript, etc.), element age or date/time of creation, and other information about the social network update elements that may be useful for enabling receiver devices 10 to determine whether to receive the content packages from a broadcast stream.

The social network update server 5 may coordinate with the broadcast or multicast system (or broadcast operation center 4) to determine scheduled broadcast times for social network update element packages, as well as other broadcast information required for reception, such as the identifier of the network stream or flow (e.g., flow ID) that will carry the content packages. The social network update server 5 may combine the scheduled broadcast time and flow ID information with the descriptive information regarding the content elements (e.g., webpage name, entity or celebrity name, social network name or ID, object ID, etc.) to generate content packet descriptions (CPDs) for transmission via an overhead flow. Such content packet descriptions may be in the form of a catalogue listing of web content elements, which may be transmitted like other content catalogs carried by the broadcast network. The social network update server 5 may provide the assembled webpage content element packages to the broadcast or multicast system (or broadcast operation center 4) via an internal network dataflow 22, along with the content packet descriptions via an internal network dataflow 24. The data packages may be stored until the appropriate broadcast time, at which point the content broadcast system (or broadcast operation center 4) encodes the appropriate packages into a multiplex broadcast waveform which is broadcast via the network broadcast transmitters 2 as broadcast/multicast transmissions of webpage content element packages (or content flows 26), and content description flows 28 which includes the content package descriptions for the social network update elements.

Typical mobile multimedia broadcast networks as well as multicast networks transmit content on a plurality of different channels or flows enabling several different programs to be broadcast simultaneously. Due to the nature of the broadcast transmission waveform, the plurality of different channels or flows may be carried over the same radio frequency spectrum, but include a structure and information that enables each of the channels or flows to be selected and received by the receiver devices 10. Individual channels or flows may be identified by an address or a flow identifier (ID). Information within the content description flow enables receiver devices 10 to determine the particular address in order to receive particular content. For example, social network updates for a first highly popular entity and a second highly popular entity may be broadcast simultaneously. Additionally, some updates for the same entity may be rebroadcast with new updates. For example, a first highly popular entity's social network updates from Monday and from a previous Sunday may be broadcast at the same time. Multicast networks may similarly transmit more than one stream of information configured so that receiver devices can selectively receive particular streams and particular portions of those streams.

Receiver devices 10 may be configured to selectively receive portions of the broadcast transmissions including social network updates of interest to their users, and may be configured to separately process the social network update content flow 26 element transmissions and the content description flow 28 packet transmissions. Specifically, receiver devices 10 may be configured to monitor the broadcast overhead flows to receive broadcast or multicast catalogs and content packet descriptions as part of determining the portion of the broadcast/multicast signal to be received. By monitoring the content package description flow, receiver devices 10 are able to identify those social network update elements that are of interest to a receiver device user (e.g., having an ID matching the social network entity to which the user has subscribed or that the user follows). Then using the information in the content package description, receiver devices 10 may be configured to activate a receiver circuit at the designated broadcast time to access the designated flow ID in order to receive selected content elements. For battery-operated receiver devices 10, this capability enables conserving battery power, since the receiver circuit may remain deenergized until the time that a desire social network update is being broadcast or multicast.

For example, broadcasts of updates for highly popular entities that the user of the receiver device 10 does not follow on Twitter may not match a subscription list identified in the content description flow 28, and therefore may be ignored.

In another embodiment, a software daemon operating on the receiver device 10 may monitor activities and inputs of the receiver device user. By monitoring the user's usage habits, this software daemon may maintain a subscription or listing of a number of highly popular social network entities that the receiver device user follows. The software daemon (operating in the background) may maintain an updated list of highly popular entities and the addresses corresponding to the ID matching the social network entity to which the receiver device user has subscribed. For example, a software daemon operating in the background may monitor the content description flow 28 to identify status update elements that are of interest to a receiver device user and comparing entity IDs within the content package descriptions for those matching the social network entity ID to which the user has subscribed. The software daemon may use the information in the content package description to activate a receiver circuit at the designated broadcast time to receive the selected content elements and store the update elements to a cache memory. Thereafter, when the receiver device user desires the status updates, the corresponding social network application on the receiver device 10 may read the status updates from the cache memory.

In order to enable receiver devices 10 to receive broadcast content elements, the content package descriptions may be broadcast in advance of content broadcast/multicasts in a manner similar to how other content catalogs are broadcast. The timing relationship between content package description broadcasts on the content description flow and the corresponding content element package broadcasts on the content flow is illustrated in FIG. 6.

Figure 6:
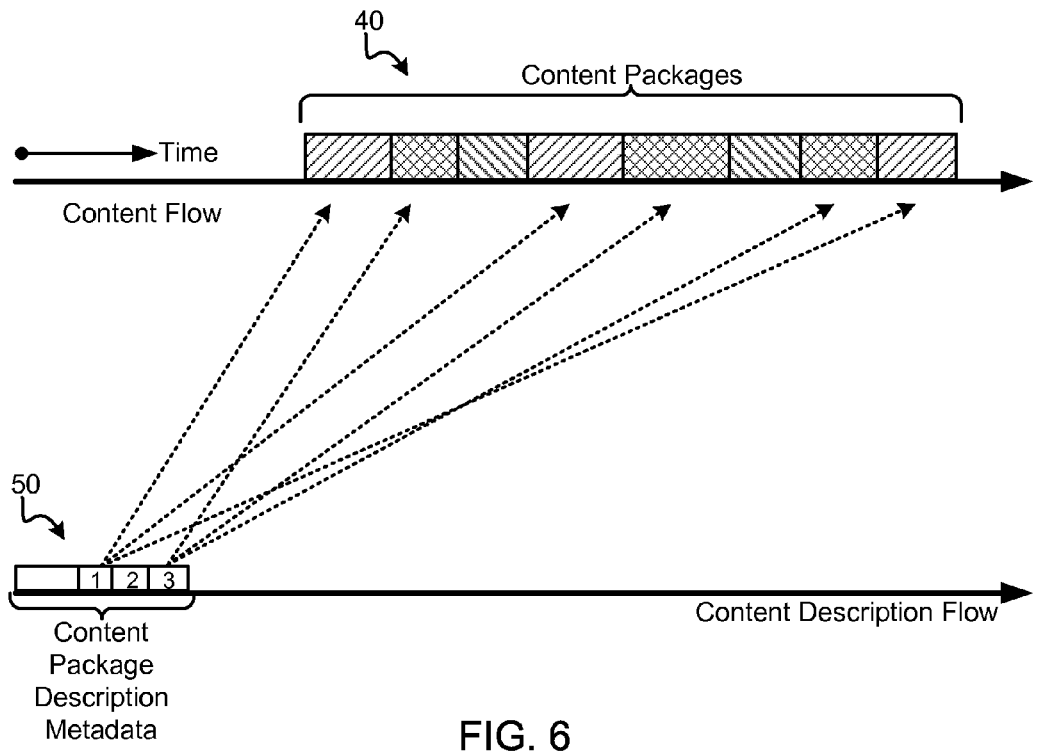
FIG. 6 is a timeline illustration of an example relationship between broadcast content flows containing the social network updates and overhead content description metadata flows according to an embodiment that describes and identifies the social network updates so the receiver device's receiver circuitry may be energized at a predetermined time to receive the social network updates and save power.

In the example embodiment illustrated in FIG. 6, the content package description packets 50 are broadcast on the content description flow of the broadcast signal before the corresponding content elements packages 40 are broadcast on the content flow of the broadcast signal. A content package description packet 50 may include information regarding the start time, broadcast address or flow ID, identity of the social network update elements (e.g., webpage identifier, social network name, social network entity name, follower name, topic name, and object ID), and other information that enables the receiver device 10 to identify and receive selected content when it is broadcast.

In another embodiment, the receiver device 10 may receive any and all updates that a second social network user or friend received. For example, a social network entity (e.g., Lady Gaga or Opra) may disclose the topics or social network entities to whom they subscribe or friend, so that their friends may receive the same social network updates. In this embodiment, the content package description packet 50 may include an identification relating to social network friends of particular social network entities. Again, this timing enables a receiver device 10 to receive the content description messages and to review the information regarding the content element packages in the broadcast (e.g., their identifier and object ID) to determine if any should be received. If the receiver device 10 determines that one or more social network status update element packages should be received based upon the identified topics or friends of a social network entity of interest to the user, the device can use the information within the content description messages to receive the identified social network status updates.

It should be noted that the webpage ID used by the transport layer to identify social network status update elements and used by the receiver devices 10 to selectively receive content of interest may be different from the webpage's normal Internet URL (in the case of an Internet website).

In order to efficiently communicate content description information in a reliable communication package, content package description messages may be generated according to an information processing algorithm that condenses the content information and formats it into a broadcast or multicast format that can be received with low error rates even in a noisy environment.

Broadcast or multicast social network update content may be divided into one or more "content flows," which refer to broadcasts or multicast of social network status update content element packages related to given social networks (or social network servers 8a and 8b). In an embodiment, content from each social network entity (e.g., Lady Gaga or Opra) may be organized into a dedicated content flow 26. For example, a highly popular social network entity may participate in multiple different social networks, with each having different social network users. For example, a first social network entity name on Twitter, a second social network entity name on Foursquare and a third social network entity name on Facebook. A content flow 26 may used to transmit all updates for a particular entity regardless of which social network the social network originated from without repeating the same status update. In order to accomplish this, the social network update server 5 may crawl the various social networks and aggregate social network data into a common database from which social network updates broadcast or multicast are generated.

In another embodiment, a content flow 26 may provide updates from a specific social network, for example, Twitter® or Facebook®. In another embodiment, the content flow 26 may include topical information of posted comments from the social network from multiple entities on a particular topic or topics of widespread interest. For example, a content flow 26 delivering updates regarding a highly popular topic may include comments or postings from multiple different social networks which all relate to the same topic. In a further embodiment, a single content flow 26 may be used to broadcast or multicast all social network updates regarding topics regardless of the social network, social network entity, or topic. In yet another embodiment, a content flow 26 may transmit content pertaining to a specific geographic location or region.

Receiver device users may select or subscribe to highly popular social network entities they wish to follow or friend. This selection may inform their receiver device 10 about the status update content element packages in the content flow 26 to receive and store. In a further embodiment, receiver devices 10 may be configured to subscribe to certain status updates based on any number of determined parameters. Such parameters may include social network attributes, followers, geographic location, advertisement preferences, friend's followers, friend's attributes, topical social network attributes, hierarchal relationships, customer demographics, user's browsing history, and/or marketing initiatives of the broadcast network service provider.

Figure 7:
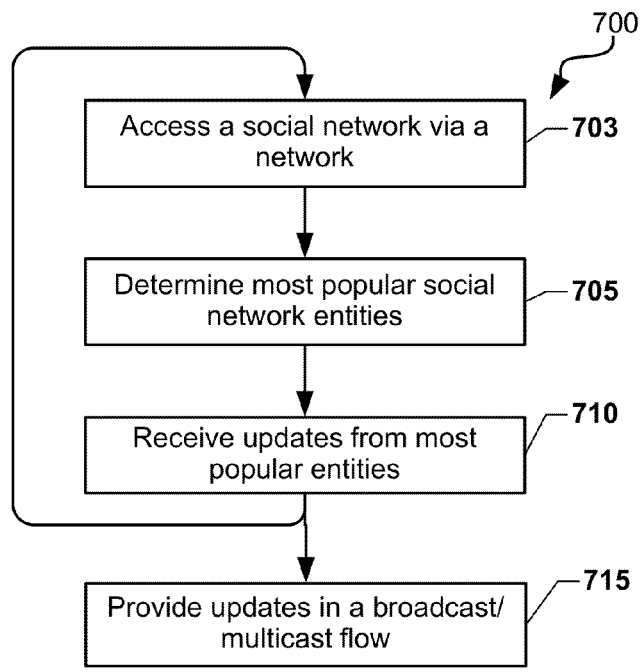
FIG. 7 is a high-level process flow diagram of an embodiment method for delivering social network updates via a broadcast or multicast network.

An embodiment method 700 for receiving social network status updates in broadcast or multicast transmissions is illustrated in FIG. 7. This embodiment method 700 may be implemented in a server having processors configured with processor-executable instructions to perform operations of the method. In an embodiment, the operations may be implemented on a distributed network and provided to a server or broadcast/multicast network.

In method 700 at block 703, a server may access a first social network via a network, such as the Internet. In block 705, the server may analyze information available in the accessed social network to identify the most popular social network entities within that social network. This operation in block 705 may involve accessing the records for a large number of public entities to determine their number of followers. Alternatively, this operation may involve accessing certain records maintained by the social network which identify their most popular entities or topics. Alternatively, this operation of identifying highly popular social network entities may be executed by another entity which provides the information to the server in block 705. The process of identifying the most popular social network entities may be accomplished regularly, so that changes in popularity are reflected in broadcast content. In this manner, the broadcast/multicast bandwidth is not consumed by update transmissions from entities with little current following.

In block 710, the server may obtain recent postings or status updates for each of the most popular social network entities identified in block 705. As part of block 710 the server may aggregate the obtained most popular status updates into a format suitable for broadcast/multicast. The server may then return to block 703 to access another social network via the Internet, repeating the operations of blocks 703, 705, and 710 in order to crawl a number of social network servers in order to determine most popular social network entities across a plurality of social networks and social network services.

Once the social network status updates from the most popular social network entities have been obtained and aggregated, in block 715, the server in cooperation with a broadcast or multicast network may broadcast the status updates in a content flow to receiver devices. As described above, the broadcast/multicast process may involve broadcasting a catalog or other type of content description message that includes broadcast scheduling information before the broadcast or multicast of the social network updates. As mentioned above, broadcast/multicast transmissions may be confined to certain geographic locations or regions so that the social network updates included in the transmissions may be relevant to those locations/regions.

Figure 8:
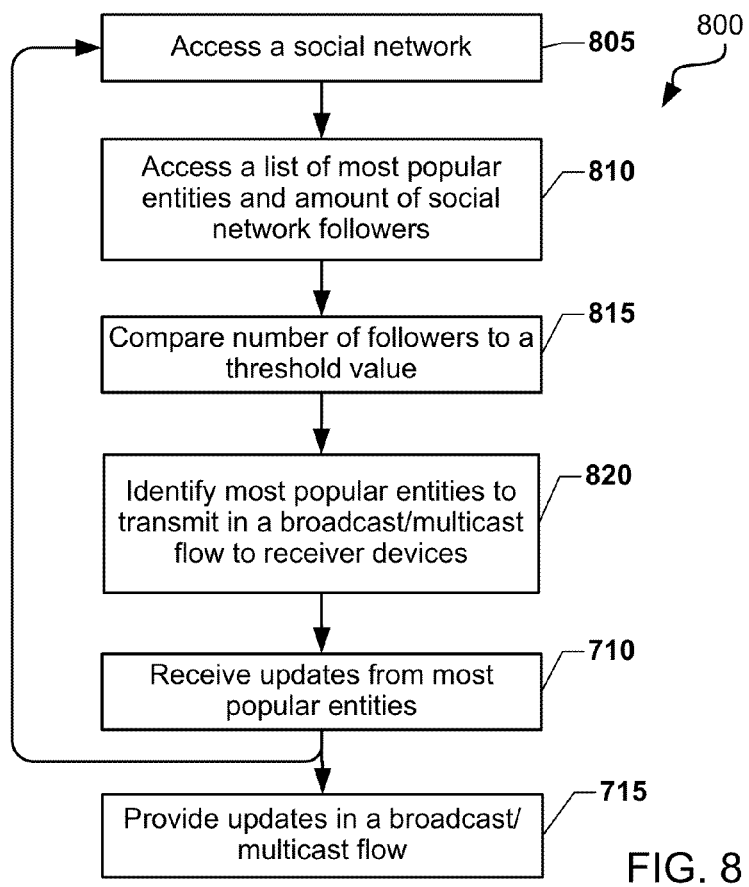
FIG. 8 is a process flow diagram of an embodiment method for determining a threshold number of highly popular social network entities to deliver posting via a broadcast or multicast network.

FIG. 8 illustrates an embodiment method 800 for determining whether a social network entity has sufficient popularity to broadcast the status updates using a broadcast communication network. The method 800 may be implemented in a server having a processor configured with processor-executable instructions to perform the operations of the method. In method 800 and block 805, the server accesses a selected social network. In block 810, the server may access a list of social network entities and their followers that is hosted by the accessed social network. For example, some social networks may advertise the popularity statistics of their most popular entities, topics, forums, etc., in which case the server may merely obtain this published information from social network directly. In block 815, the number of social network followers for particular social network entities obtained in block 810 may be compared to a predetermined threshold value. As discussed above, the threshold at which it may make sense to deliver social network updates via the broadcast or multicast process may depend upon the number of economic, technical and practical factors. For example, the predetermined threshold may be set at a value that ensures the costs associated with broadcasting the updates are justified by the network savings associated with moving network traffic associated with those updates off of an active network. Such factors may include the impact that a large number of requests for social network updates would have on particular communication networks, the costs associated with aggregating social network updates and delivering them by broadcast or multicast processes, a number of subscribers to the broadcast/multicast service, etc. These factors may be evaluated in advance to identify the threshold at which it make sense to broadcast or multicast the entity's social network updates. In another embodiment, the threshold may be dynamic and related to the size of the social network content updates, the number of highly popular social network entities, changes in bandwidth capacity of communication networks, etc. In another embodiment, the threshold may be dependent on the social network. For example, Twitter utilizes SMS in some embodiments to deliver social network updates while other social networks may deliver larger files in updates. Thus, Twitter social network updates that are SMS based may be acceptable and may not place any burden on the network even at 10,000 followers or more. However, SMS social network updates may provide a reference or hyperlink to media in the social network update which may cause problems for a second server and constrain the resources of the second server. In this aspect, the constraint on a second server to access the hyperlink may be reviewed to determine if it is more economical to broadcast the social network update and the broadcast may incorporate the social network update and the content of the hyperlink for speedy and more economical delivery to a large number of followers.

In block 820, the most popular social network entities may be identified so that their updates can be obtained and transmitted in a broadcast or multicast content flow for reception by receiver devices. With the most popular social network entities identified for broadcast or multicast delivery, the server may obtain recent postings are status updates from those identified entities in block 710. As mentioned above, as part of block 710, the server may aggregate the obtained status updates in a format suitable for broadcast or multicast transmission. The server may then return to block 805 to access another social network and repeat the process, thereby crawling across the plurality of social networks to obtain updates and postings from those social network entities whose popularity exceeds the predetermined threshold. Once all of the social network status updates have been obtained and aggregated, the server in cooperation with a broadcast or multicast network may broadcast those updates as described above in block 715.

Figure 9:
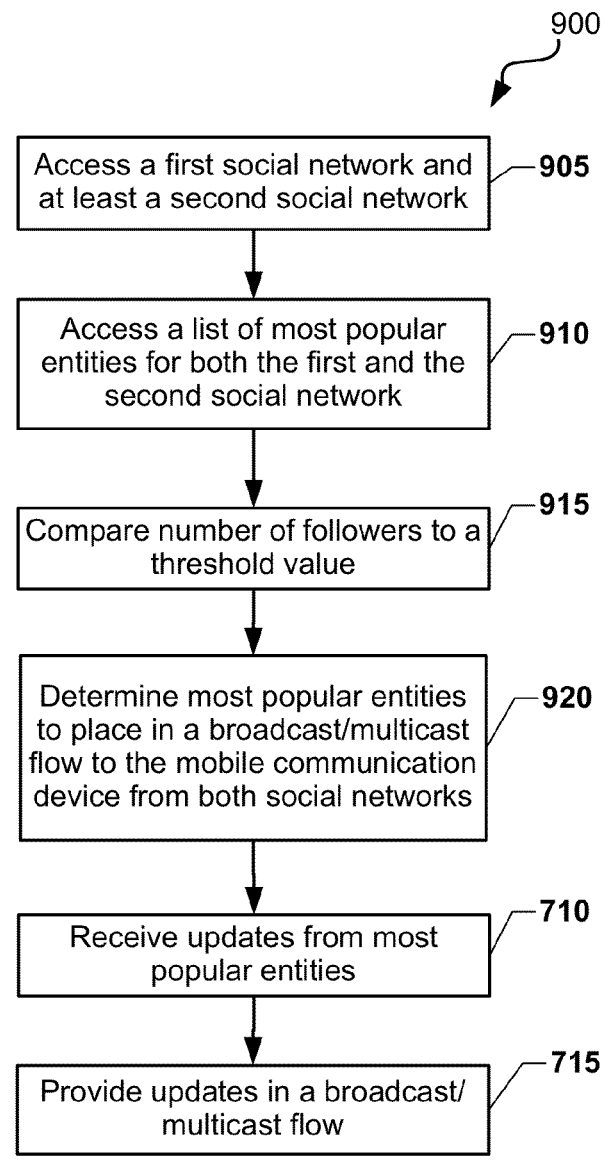
FIG. 9 is a process flow diagram of an embodiment method for determining a threshold number of highly popular social network entities for at least two different social networks to deliver updates via a broadcast network.

FIG. 9 illustrates an embodiment method 900 for determining whether a social network entity has sufficient popularity across at least two different social networks to justify broadcast or multicast of the entity's status updates. Highly popular social network entities may maintain a presence or publish updates on multiple social networks, and the combined popularity of that entity's updates may justify broadcast or multicast processing even if the popularity on a single network might not. Thereafter, the server may determine whether a social network entity has sufficient followers (e.g., comparing the number of followers to a threshold value) after determining popularity in a plurality of social networks.

In method 900 at block 905, a server may access a first social network and a second social network. In block 910, a list of social network entities and their followers are accessed and their dependencies are determined for both the first and the second social networks. In block 915, a number of social network followers for the social network entity across the two or more social networks of the may be compared to a predetermined threshold value. In block 920, the server may determine the most popular social network entities based upon the total number of followers in both the first and second social networks. With the most popular social network entities identified for broadcast or multicast delivery, the server may proceed to obtain recent postings are status updates from those identified entities in block 710. This operation may require re-accessing the first and second social networks (as well as any other networks) in order to obtain the updates from the identified most popular social network entities. Once all of the social network status updates have been obtained an aggregated, the server in cooperation with a broadcast or multicast network may broadcast those updates as described above in block 715.

While the example illustrated in FIG. 9 considers just two social networks, the same concept may be applied to determine the most popular social network entities among any number of social networks that may be analyzed by the server. Thus, in the various embodiments, the most popular social network entities may be identified based upon the number of followers in a single social network, a selected number of social networks, or all social networks evaluated by the server.

Figure 10:
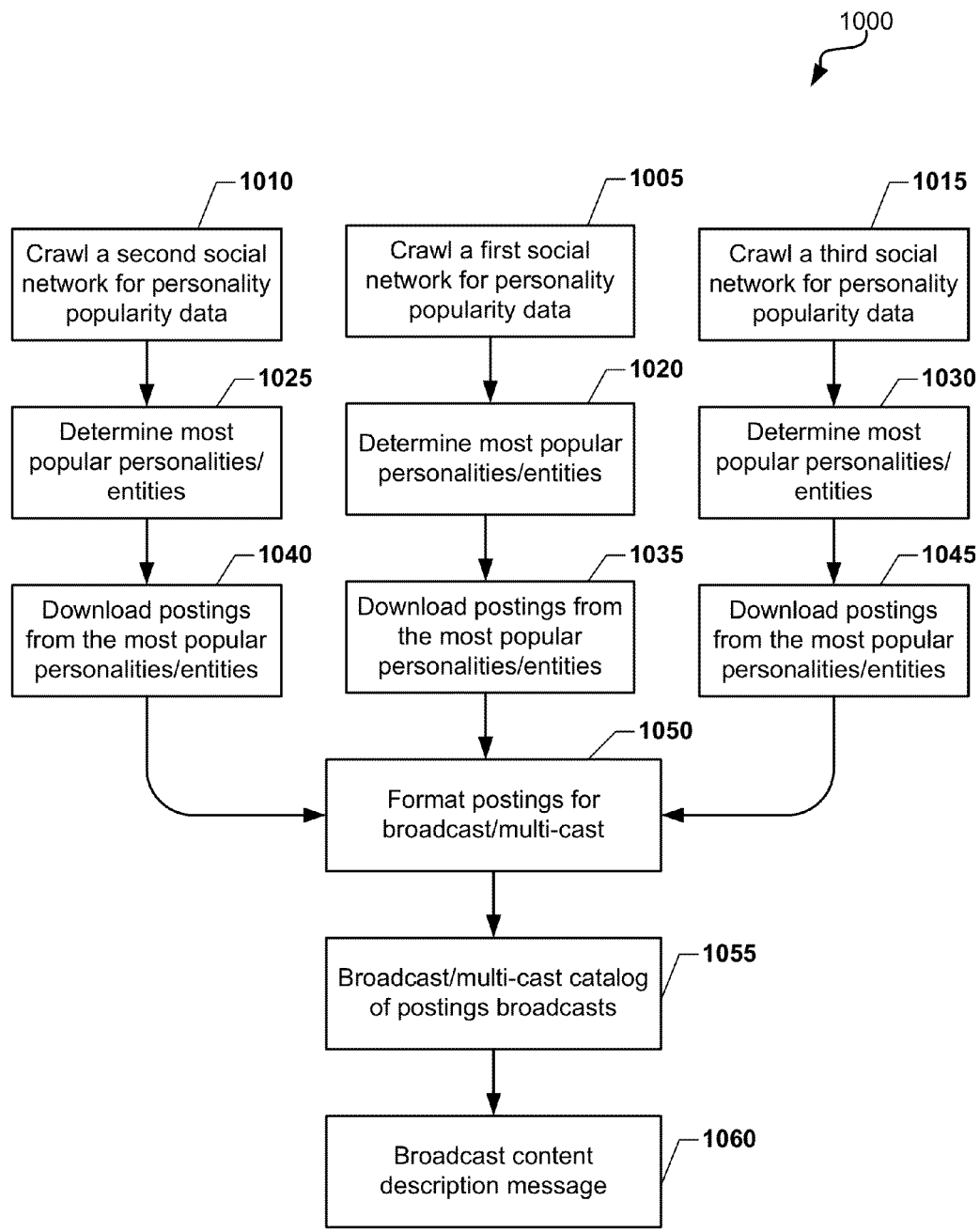
FIG. 10 is a process flow diagram of an embodiment method that may be implemented on a server for crawling multiple social networks to receive and aggregate postings for highly popular entities and formatting the postings for broadcast via a broadcast or multicast network.

FIG. 10 illustrates an embodiment method 1000 for aggregating data from a number of different social networks to broadcast or multicast social network status updates. The embodiment method 1000 may be implemented in a server configured with server instructions to perform the operations of the method. In block 1005, the server may crawl a first social network for data relating to postings of popular entities and social network updates. In this operation, the server may access several of the social network entity postings or pages in sequence to gather information about each. In block 1020, the server may determine the most popular social network entities, and in block 1035 the server may download the postings of the most popular social network personalities.

In block 1010, the server may crawl a second social network for data relating to postings of popular entities and social network updates in a similar manner. In block 1025, the server may determine the most popular social network entities for the second social network, and in block 1040 the server may download the posting of the most popular social network entities for the second social network.

In block 1015, the server may crawl a third social network (and other networks) for data relating to postings of popular social network entities and social network updates. In block 1030, the server may determine the most popular social network entities for the third social network. In block 1045, the server may download the posting of the most popular social network entities for the third social network.

In block 1050, the server may format and aggregate the obtained postings from the highly popular social network entities of all three (or more) social networks for broadcast/multicast transmission, and in block 1055 the server may broadcast or multicast the postings via a broadcast or multicast network. In block 1060, the server may also optionally broadcast a content description message identifying the broadcast times, the content, the channel and other identifying data so that receiver devices may receive the aggregated data that is of interest, while ignoring content transmissions of no interest to the devices' users. The various blocks in the method 1000 may occur asynchronously or in different order than shown in FIG. 10.

Figure 11:
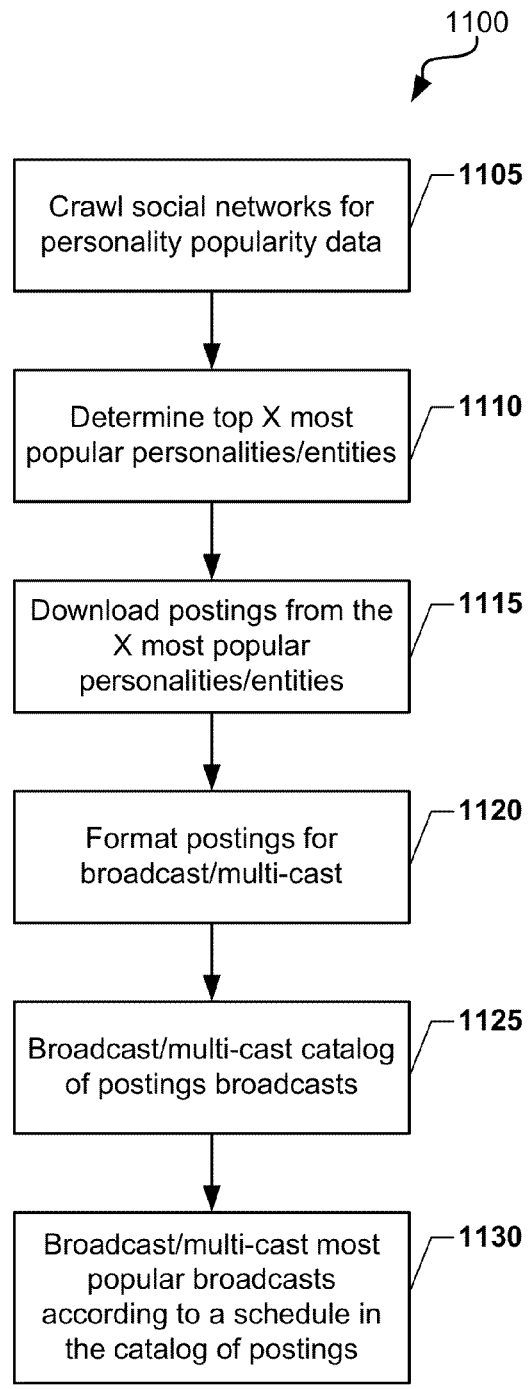
FIG. 11 is a process flow diagram of an embodiment method for determining highly popular social network entities and aggregating and formatting postings from the highly popular entities to broadcast the postings via a broadcast or multi-cast network.

FIG. 11 illustrates another embodiment method 1100 for transmitting broadcast/multicast social network status updates for most popular personalities and entities. To enable receiving broadcast social network updates from highly popular entities or highly popular topics, the embodiment method 1100 employees a service that "crawls" the social network sites at block 1105. This crawling of social networks determines the top X most popular social network individuals at block 1110. Popular postings may be those received by the most followers. Additionally, postings may be related to different topics that are the most popular social network topics. The server may obtain the postings from the most popular social network entities from their respective social networks at block 1115, and package the social content update postings into a broadcast format at block 1120. The server may further form and broadcast packets and electronic catalogs announcing broadcast times at block 1125 as described above with reference to FIG. 5. The postings or updates in the X most popular personalities or entities may be broadcast or multicast according to the schedule in the catalog of postings at block 1130.

The popular social network identities may be selected social networks themselves, rather than a third party server as described above. This may be accomplished through cooperation between at least two social network entities. Alternatively, social networks may provide their own lists of popular entities. These lists may be determined and updated periodically to reflect changes in popularity that occur over time as identities shift in popularity. For example, trends may be analyzed on an hourly or minute-by-minute basis. These subscription lists may also include popular entities from just one social network, at least two social networks, or multiple social networks, both domestic and worldwide.

Figure 12:
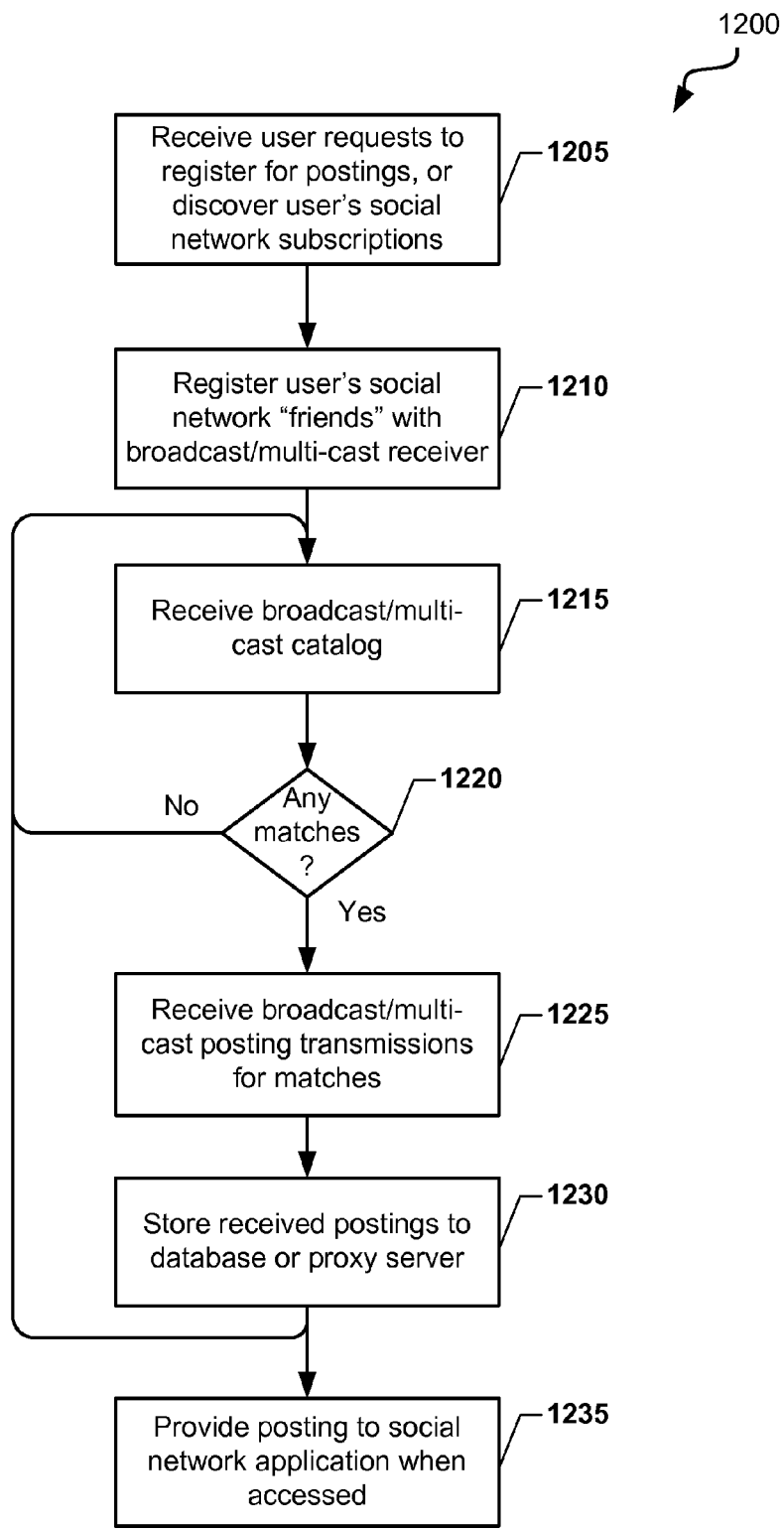
FIG. 12 is a process flow diagram of an embodiment method for determining a subscription parameter of a user and comparing the subscription parameter to a broadcast catalog to receive selected highly popular social entities' postings via a broadcast or multi-cast network.

FIG. 12 illustrates an embodiment method 1200 for receiving the broadcast status updates at a receiver device. Embodiment method 1200 may be implemented in a receiver device having a processor configured with processor executable instructions to perform the operations of the method 1200. In method 1200, the receiver device user's subscription data (i.e., the user's social network contacts) may be registered with a broadcast/multi-cast receiver module in block 1205. The receiver device user's personal list may be stored on the receiver device or may be stored remotely, such as on a social network server or "in the cloud" in block 1210. A broadcast or multicast catalog may be received by the receiver device in block 1215. Reception of such a broadcast or multicast catalog may be accomplished by the receiver device tuning into the appropriate overhead data stream or transmission flow at the normally scheduled time for such catalog transmissions. As part of receiving the broadcast or multicast catalog in block 1215, the receiver device processor may unpack the catalog and access any data tables identifying social network updates scheduled for broadcast or multicast. The to-be broadcast/multicast social network updates may include a network and/or entity identifier.

In determination block 1220 the processor may compare the social network and/or entity identification in the in the broadcast/multicast catalog with a list of identifiers of the social network entities followed by the receiver device user to determine whether a match exists. If the processor determines that there are no matches in the received broadcast/multicast catalog (i.e., determination block 1220="NO"), the processor may take no actions to receive broadcast or multicast transmissions since they contain no updates of interest to the user. However, the processor may continue to receive updates to the broadcast or multicast catalog in block 1215. If the processor determines that there are at least one match between the user's "friends" and the updates listed in the received broadcast/multicast catalog (i.e., determination block 1220="YES"), the processor may receive the matching broadcast/multicast update transmissions at the transmission time identified in the broadcast/multicast catalog in block 1225. This may be accomplished at the broadcast/multicast time by energizing the receiver circuit within the receiver device in time to receive the matching posting. Updates received on the receiver device may be cached in local memory, such as in a database or in proxy server data in block 1230. Then at a later time when a social network application is run on the receiver device, that application may access the cached updates in block 1235. This may be accomplished by the social network application being configured to search for social network update stored in the local database or proxy server data before attempting to download the updates from the social network via an external network (e.g., the Internet). Thus, if a desired posting is in the receiver device memory, the application obtains the status update without accessing an external network. The receiver device may only go out to the social network server for postings from other "friends."

Figure 13:
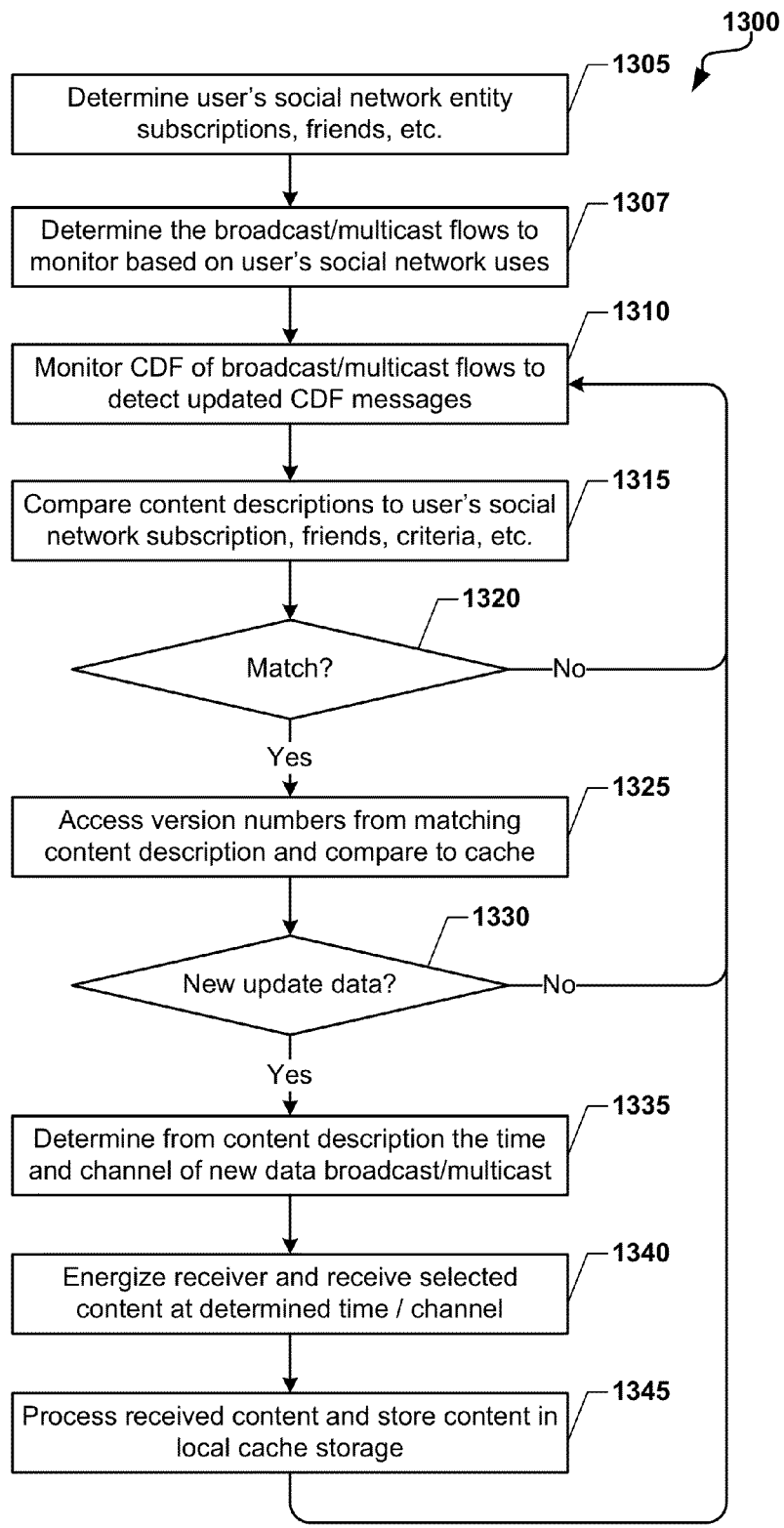
FIG. 13 is a process flow diagram of an embodiment method that may be implemented in a receiver device for receiving broadcasts of social network updates based on a social network hierarchy and identifiers in an overhead content description feed and determining whether some data in cache is stale so that data may be deleted to receive and cache newly broadcast social network updates.

In an embodiment, receiver devices may be configured to only receive those social network entity updates matching the user's subscriptions or friends that have not already been received and stored in memory. FIG. 13 illustrates an embodiment method 1300 for implementing this embodiment. The embodiment method 1300 may be implemented in a receiver device by configuring the device's processor with processor-executable instructions to perform the operations of the method. In method 1300 at block 1305, the device processor may determine the user's selected, friended or subscribed to social network entities and topics. In an embodiment, this determination in block 1305 may be accomplished by social network applications registering with an application or local service for receiving updates via broadcast or multicast. In another embodiment, this determination in block 1305 may also or alternatively be accomplished by monitoring the user's device usage to recognize social network usage, requests and update receipts. For example, a software daemon operating in the background may determine highly popular social network entities or topics that the receiver device user follows. In another embodiment, this determination in block 1305 may be accomplished by the processor receiving from various social network sites information regarding the user's membership or subscription, as well as a list of highly popular social network entities friended by the user. In another embodiment, this determination in block 1305 may be in the form of user input through a GUI, such as the user typing in identifiers for social network entities of interest or selecting a hyperlink (or other actionable user interface device) which informs the processor of the user's selection of a particular social network entity to be monitored for updates. In another embodiment, this determination in block 1305 may be accomplished using any combination of the forgoing methods.

In block 1307, the processor may determine the broadcast or multicast flows or channels to monitor for broadcast/multicast updates based upon the user's subscriptions, friends, etc. determined in block 1305. Particular broadcast and/or multicast streams may carry updates for specific social networks, so a receiver device may need to monitor more than one broadcast and/or multicast network to received all updates relevant to the user. In block 1310, the receiver device may monitor the content description flow or other overhead message transmitting a listing and description of scheduled status update content element package broadcasts/multicasts to detect when an updated content description message is received. In block 1315, the receiver device may compare social network entity identifiers in the status update content package descriptions in received updated content description messages to the user's subscriptions, friends, etc. determined in block 1305, and determine if there are any matches in determination block 1320. If the information in the content description does not match status updates that are relevant for the receiver device user (i.e., determination block 1320="No"), the receiver device may continue to monitor the content description flow in block 1310.

If the processor determines that information in the content description includes status updates that are relevant for the receiver device user (i.e., determination block 1320="Yes"), the processor may access version numbers within the content description message for any matching update, and compare this data to version numbers of updates already stored local cache storage in block 1325. In determination block 1330, the processor may determine whether the relevant updates scheduled for broadcast or multicast is new (i.e., has not been received and cached already) by determining whether each matching update identifier has a version number that is the same (or earlier than) as an update stored in cache. This determination may be made because broadcasters may broadcast the same content multiple times to increase the probability that receiver devices are able to receive a broadcast. Also, the same update from a given entity may be posted by more than one social network, or may be transmitted over more than one broadcast and/or multicast network. If the processor determines from the version information in the content description that all matching status updates scheduled for broadcast are already stored in cache memory (i.e., determination block 1330="No"), the receiver device may ignore the scheduled broadcasts/multicasts and continue to monitor the content description flow in block 1310. In this manner, receiver devices can avoid the unnecessary power drain from downloading redundant copies of broadcast/multicast updates.

If at least one matching scheduled update has a version number later than that of updates from the same entity stored in cache (i.e., determination block 1330="Yes") indicating that the update is new to the receiver device, the processor may determine from the content description message the scheduled time and channel/flow/address of the new update broadcast/multicast in block 1335. The processor may leave the receiver circuitry deenergized until the broadcast or multicast time identified in order to conserve battery power. Then at the scheduled transmission time, the processor may energize the receive circuit (e.g., wireless receiver circuits) to receive the new update broadcast/multicast on the identified channel/flow/address in block 1340. In block 1345, the processor may process the received data messages to recover the selected update(s), including performing error correction, formatting and rendering as necessary, and store the new update(s) to the cache memory. The process of method 1300 may repeat continuously with the processor returning to block 1310 to monitor the content description flow for new schedules of social network update broadcasts/multicasts.

Figure 14:
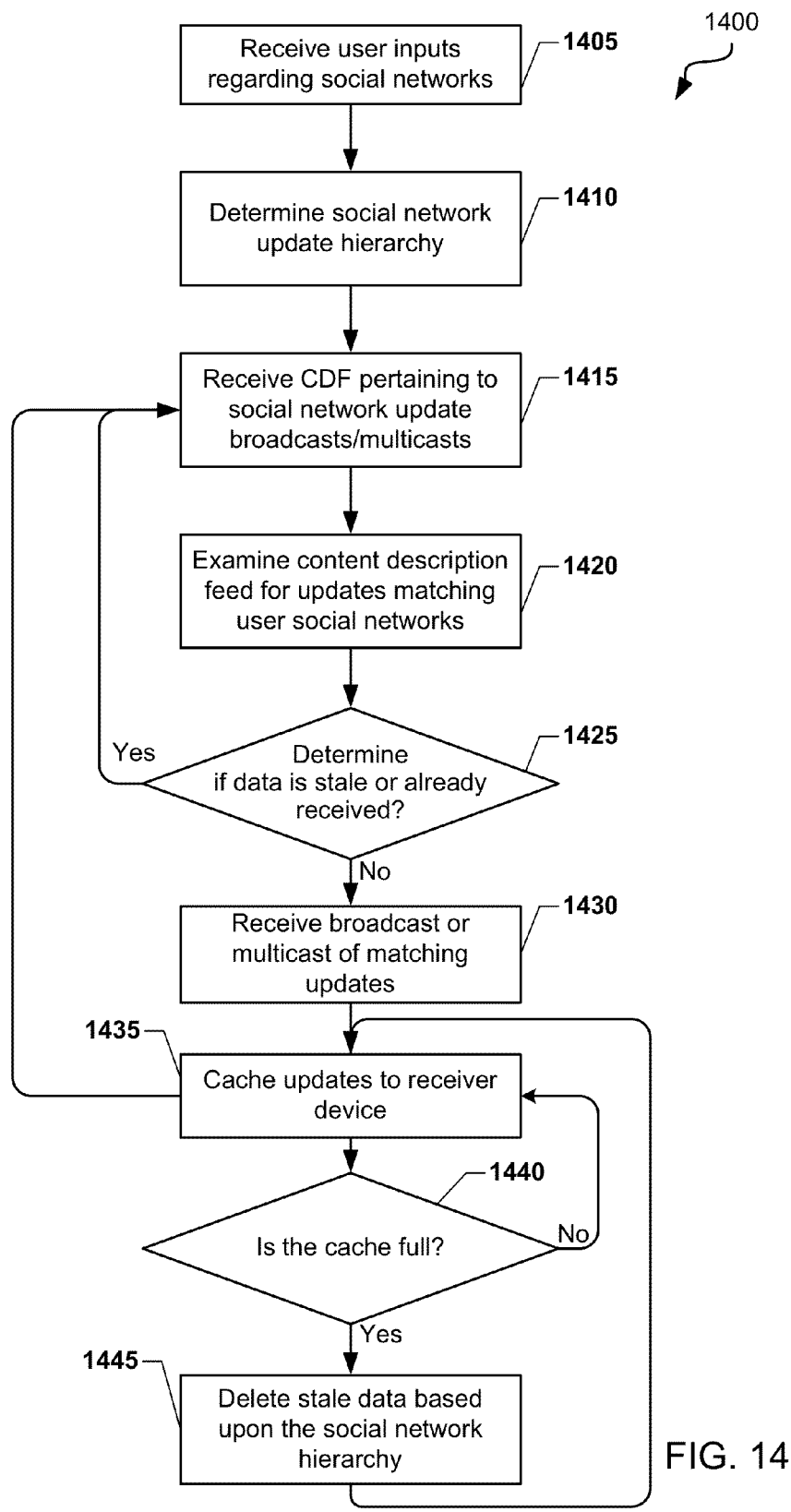
FIG. 14 is a process flow diagram of an embodiment method for receiving social network updates via a broadcast network.

In addition to selecting for reception new updates while ignoring already received updates, receiver devices may decide to receive social network update broadcasts/multicasts based on the age of the updates, and make room in the cache memory for new updates by preferentially deleting older, lower priority updates. FIG. 14 illustrates an embodiment method 1400 for receiving the broadcast status updates at a receiver device 10, including operations for deleting stale updates from memory in order to make room for newly received updates. The embodiment method 1400 may be implemented in such a receiver device 10 by configuring its processor with processor-executable instructions to perform the operations of the method.

In method 1400 in block 1405, a receiver device processor may receive user inputs regarding preferences or priorities among the user's social network memberships and social network entities. In block 1410, the processor may determine a social network update hierarchy based upon the user inputs. This hierarchy may rank the various social networks so that preferred social networks have higher priority than other networks. This hierarchy may also rank various social network entities, so that some entities have higher priority than others. This hierarchy enables the processor to receive and store social network updates consistent with user preferences. For example, the receiver device user may identify a number of topics that the user is interested in receiving social network postings. The receiver device user also may identify a number of social network entities that the receiver device user is interested in receiving social network postings.

In an embodiment, the social network hierarchy determined in block 1410 may be determined by the receiver device adopting another user's social network hierarchy, such as a friend's social network hierarchy, or a hierarchy recommended by a particular social network entity to which the user has subscribed.

In another embodiment, the receiver device may determine a location or geographic parameter specific social network hierarchy in block 1410. For example, the most popular social network entities in New York, N.Y. may be given priority over other social network entities (e.g., those relevant to San Diego, Calif.). In another embodiment, the location or geographic parameter specific social network hierarchy determined in block 1410 may be dynamic and may change depending on a location of the receiver device (e.g., determined based on networks or GPS receivers).

In another embodiment, the social network hierarchy determined in block 1410 may be based on the user's selected social network topics. For example, the user may be interested in the topic "APPLE® I-PAD®2". In such a case, the social network hierarchy determined in block 1410 may be based on social network users that include profile information relevant to the topic or may be formed based on users that are prominent that discuss the topic in social network updates.

In block 1415, the processor may receive a content description message or other type of overhead message that includes data identifying social network status update information in block 1415. In block 1420, the processor may examine the content description message to determine if any social network updates to be broadcast or multicast are relevant to or match the user's social network subscriptions or friends to determine whether any broadcasts/multicasts should be received as described above. In determination block 1425, the processor may also determine if any matching are relevant social network updates about to be broadcast or multicast are stale. The processor may determine that updates are stale by comparing a posting date or version date in the received description to a current date, past a threshold date, or otherwise determining the age of the update. Some users may prefer to only receive very recent updates from their highly popular social network entities "friends," even when older updates have not been stored in memory. This determination may be in addition to or in place of the processor determining whether an update has already been stored in memory as described above with reference to FIG. 13.

If the processor determines that all matching social network updates are stale (i.e., determination block 1425="Yes"), the processor may not receive the update broadcasts/multicasts, and return to block 1415 receive the next content description message. On the other hand, if any matching social network updates are not stale (i.e., determination block 1425="No"), the processor may control the receiver circuitry in order to receive the broadcast or multicast update messages in block 1430 according to the operations described above with reference to FIG. 13 (particularly blocks 1335 through 1345). The processor may cache received status updates to a cache memory on the receiver device in block 1435.

As part of storing receive status updates to the cache memory, in determination block 1440, the processor may determine if the cache is full, such as by comparing the memory status to a threshold amount of data in cache. If there is sufficient space in the cache memory, the updates will continue to be cached in block 1435 until either the cache memory is full or all received updates have been stored. When the processor determines that the cache memory is full (i.e., determination block 1440="Yes"), the processor may delete a portion of the data stored in cache based upon the social network hierarchy and the age of the updates in block 1445. In this manner, storage space for caching the latest received updates is created by first deleting lowest priority updates, starting with the oldest (most stale). Thus, instead of deleting all old social network updates, the processor may delete the oldest updates of the lowest priority social network entity updates in accordance with the hierarchy determined in block 1410. The process of making room in the cache for new updates in blocks 1440 and 1445 and caching the new updates in block 1435 may continue until all receive social network updates have been cached. At this point, the processor may return to block 1415 to continue monitoring content description feeds for further social network updates of interest to the device user.

Figure 15:
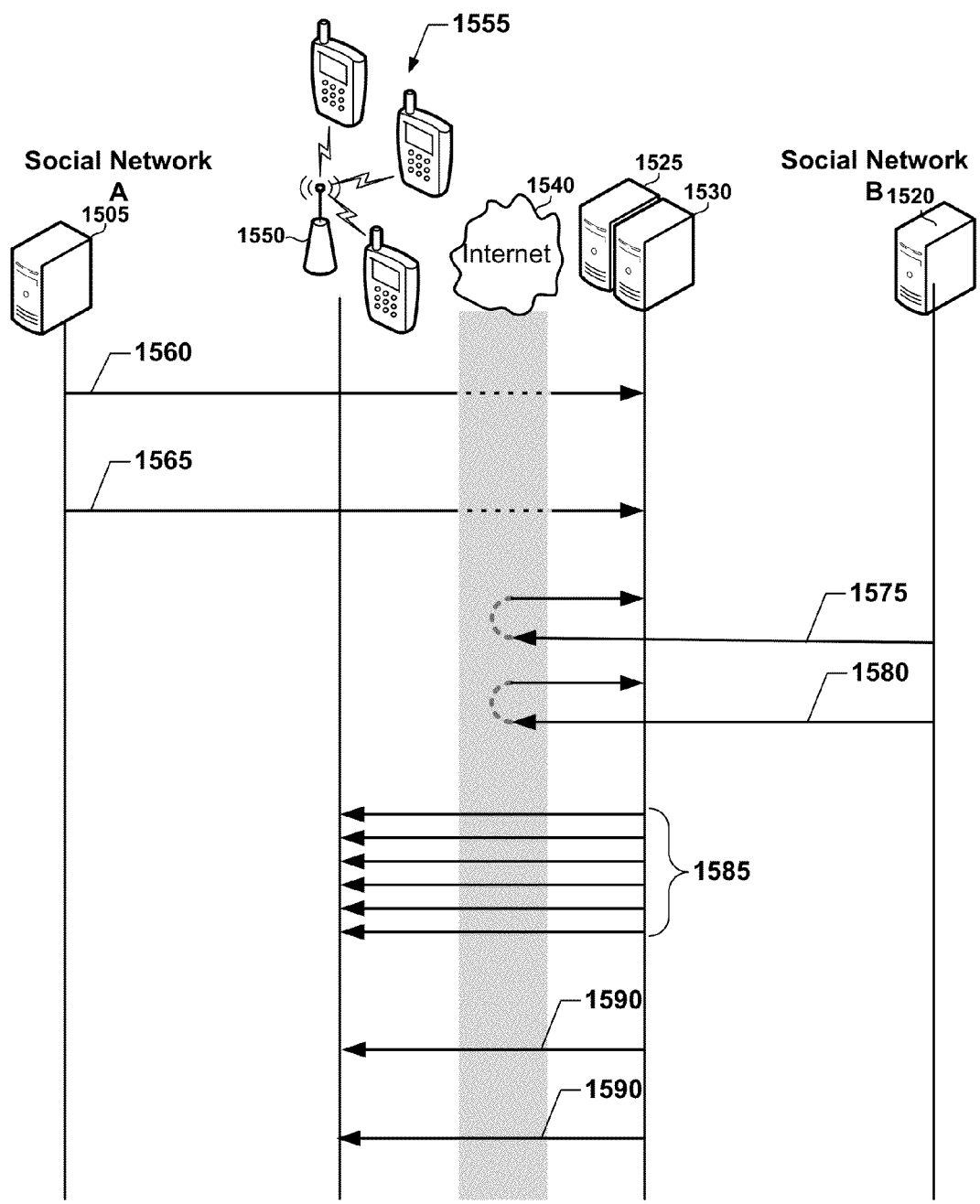
FIG. 15 illustrates communication flows by which a receiver device may receive status updates from at least two social networks via a broadcast or multicast communication network.

FIG. 15 illustrates message exchanges within a system according to the various embodiments. In the illustrated system, a first social network A may include a first networ server 1505, and a second social network B may include a second social network server 1520. Also, illustrated are a social network update server 1525 and a broadcast/multicast network server 1530. The illustrated network also includes receiver devices 1555 which may receive broadcasts and/or multicasts via a cellular data network 1550 (illustrated as a base station antenna).

The social network update server 1525 may perform the methods described above for crawling social networks, identify the highly popular entities, obtaining updates from the highly popular entities, and formatting the updates for broadcast and/or multicast. The broadcast/multicast network server 1530 may be part of a broadcast or multicast network and configured to schedule the transmission of the social network updates and the associated electronic service guides or catalog messages as described above. For example, a broadcast/multicast network server 1530 may be configured to manage the scheduling of content broadcasts, and generation of electronic service guides or catalog messages which provide receiver devices 1555 with the information they need to select receive particular update transmissions as described above.

The social network update server 1525 may connect with the social network servers 1505 and 1520 via any available network, such as the Internet 1540. The first social network A may provide updates from highly popular social network entities to the social network update server 1525 as shown by communications 1560 and 1565. Similarly, the second social network B may provide updates from highly popular social network entities from the second social network server 1520 to the social network update server (e.g., a media FLO server) 1525 as shown by communications 1575 and 1580. The social network update server 1525 may aggregate the status updates for broadcast and provide the aggregated updates to the broadcast/multicast network server 1530. The broadcast/multicast network server 1530 may schedule the updates for broadcast or multicast, and generate overhead schedule messages including content description messages, such as an electronic service guide or catalog of update transmissions. These overhead schedule messages may be transmitted (i.e., communications 1585) via a network, such as via a cellular data network 1550, to all receiver devices 1555. In order to ensure receiver devices are able to receive the content description messages reliably, the same content description messages (i.e., the communications 1585) may be transmitted multiple times and on a frequent basis. Some time after the content description messages (i.e., the communications 1585) are transmitted, the social network updates are transmitted (communications 1590) via the broadcast or multicast network, such as via the cellular data network 1550. As mentioned above with reference to FIG. 13, in order to ensure receiver devices are able to receive the content description messages reliably, the same content description messages (i.e., the communications 1585) may be transmitted multiple times. Using the information within the content description messages of the, the receiver devices 1555 may access channel information, identification information and broadcast information required to determine whether to receive update transmissions, and then to energize receiver circuitry at the correct time in order to receive the selected broadcast/multicast social network update transmissions. In a typical embodiment, the status updates may be updated.

In another embodiment, the cellular communication system (or cellular data network 1550) may cache the gathered social network postings of highly popular entities on servers that are located in the network near an edge of a cellular network such as in regional control centers or in servers connected to individual base station sites, such as the broadcast/multicast network server 1530 illustrated in FIG. 15. In this embodiment, when a mobile device (i.e., one of the recipient devices 1555) accesses the cellular data network 1550 requesting an update for a popular entity from a social network, such as network A or B, the local cache server (e.g., the broadcast/multicast network server 1530) may respond by operating as proxy for that network (e.g., acting as a proxy for social network servers 1505 or 1520). In this manner, the response to the request can be transmitted to the requesting device (i.e., the one of the recipient devices 1555) via the cellular data network 1550 without passing the request and the response through other networks, such as the Internet 1540. In an embodiment, update postings from highly popular social network entities may be both broadcast/multicast as described above, and cached in servers positioned near the edge of cellular data networks 1550. In this manner, those receiver devices 1555 configured to receive broadcast/multicast updates will not have to access any networks for the updates, while other receiver devices can obtain the same updates from peripherally positioned proxy servers (e.g., the broadcast/multicast network server 1530) without burdening the Internet 1540 or other networks.

Figure 16:
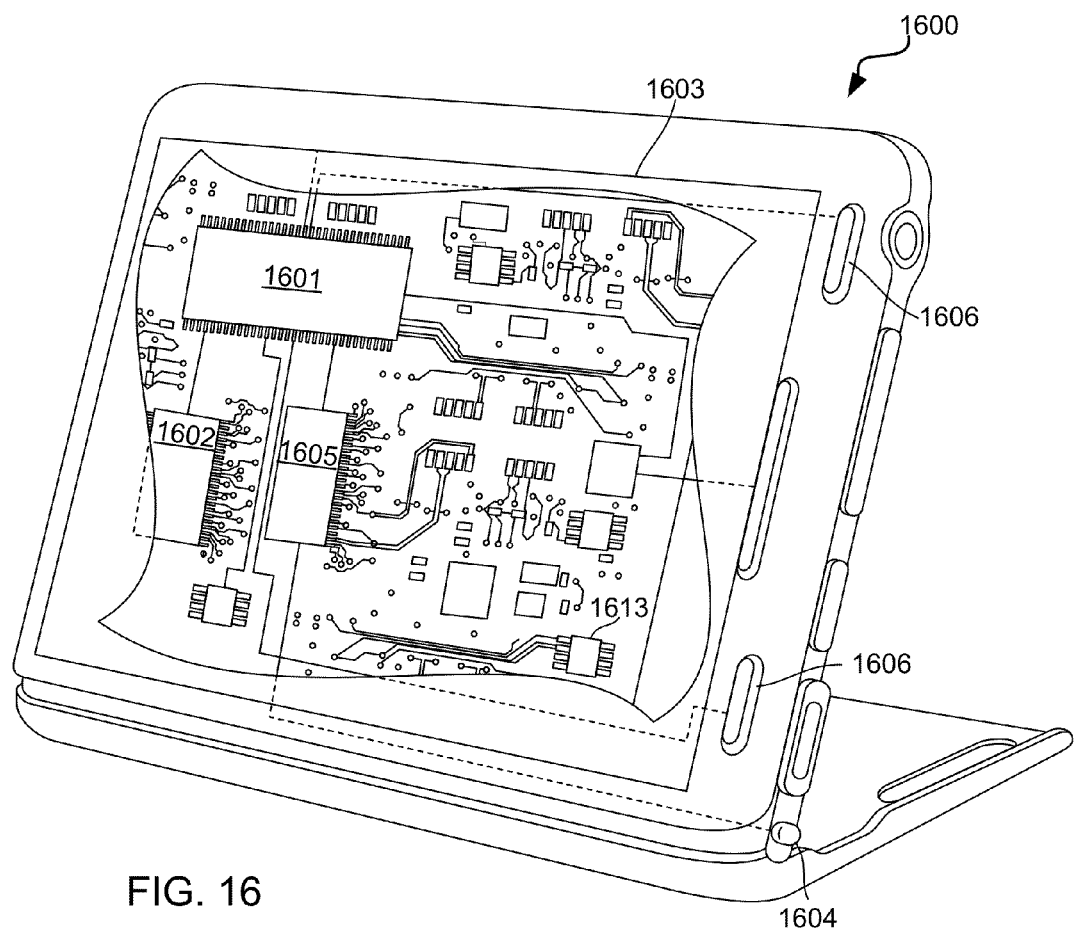
FIG. 16 is a component block diagram of a receiver device suitable for use in an embodiment.

FIG. 16 is a system block diagram of a receiver device suitable for use with any of the embodiments. The embodiments may be implemented in a variety of receiver devices, particularly mobile computing devices. An example of a receiver device that may implement the various embodiments is a smart phone 1600 illustrated in FIG. 16. A multi-processor receiver device, such as a smart phone 1600, may include a processor 1601 coupled to memory 1602 and to a radio frequency data modem 1605. The modem 1605 may be coupled to an antenna 1604 for receiving and transmitting radio frequency signals. The smart phone 1600 may also include a display 1603, such as a touch screen display. The receiver device may also include user input devices, such as buttons 1606, to receive user inputs.

The receiver device processor 1601 may be any programmable microprocessor, microcomputer or multiple processor chip or chips that can be configured by software instructions (applications) to perform a variety of functions, including the functions of the various embodiments described herein. In some devices, multiple processors 1601 may be provided, such as one processor dedicated to wireless communication functions and one processor dedicated to running other applications. In another embodiment, the processor may be a virtual processor.

Typically, software applications may be stored in the internal memory 1602 before they are accessed and loaded into the processor 1601. In some mobile computing devices, additional memory chips (e.g., a Secure Data (SD) card) may be plugged into the receiver device and coupled to the processor 1601. The internal memory 1602 may be a volatile or nonvolatile memory, such as flash memory, or a mixture of both. For the purposes of this description, a general reference to memory refers to all memory accessible by the processor 1601, including internal memory 1602, removable memory plugged into the receiver device, and memory within the processor 1601.

Figure 17:
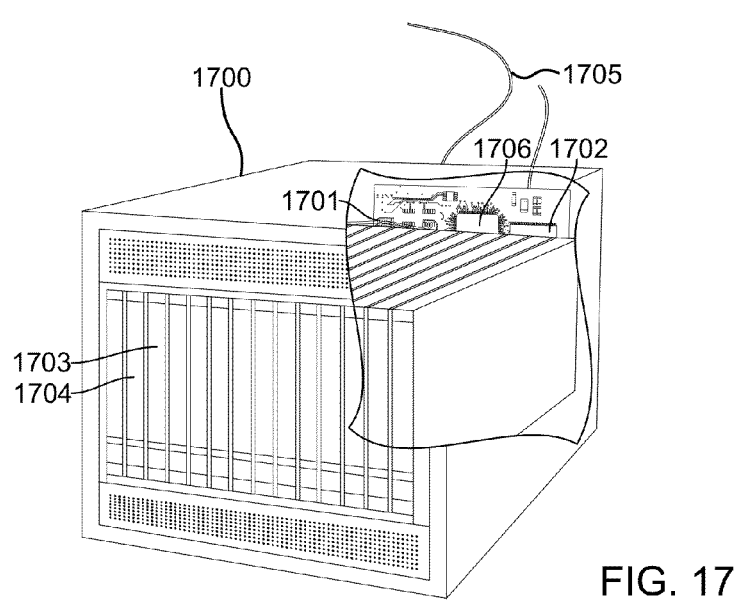
FIG. 17 is a component block diagram of a server device suitable for use in an embodiment.

The various embodiments may be implemented on any of a variety of commercially available server devices, such as the server 1700 illustrated in FIG. 17. Such a server 1700 typically includes a processor 1701 coupled to volatile memory 1702 and a large capacity nonvolatile memory, such as a disk drive 1703. The server 1700 may also include a floppy disc drive, compact disc (CD) or DVD disc drive 1706 coupled to the processor 1701. The server 1700 may also include network access ports 1704 coupled to the processor 1701 for establishing data connections with a network 1705, such as a local area network coupled to other broadcast system computers and servers. The server processor 1701 may be any programmable microprocessor, microcomputer or multiple processor chip or chips that can be configured by software instructions (applications) to perform a variety of functions, including the functions of the various embodiments described above. Typically, software applications may be stored in the internal memory 1702, and 1703 before they are accessed and loaded into the processor 1701. The processor 1701 may include internal memory sufficient to store software instructions. For the purposes of this description, a general reference to memory refers to memory accessible by the processor 1701 including volatile memory 1702, disk drives 1703, floppy disc drives, CD/DVD disc drives 1706 and memory within the processor 1701 itself.

Figure 18:
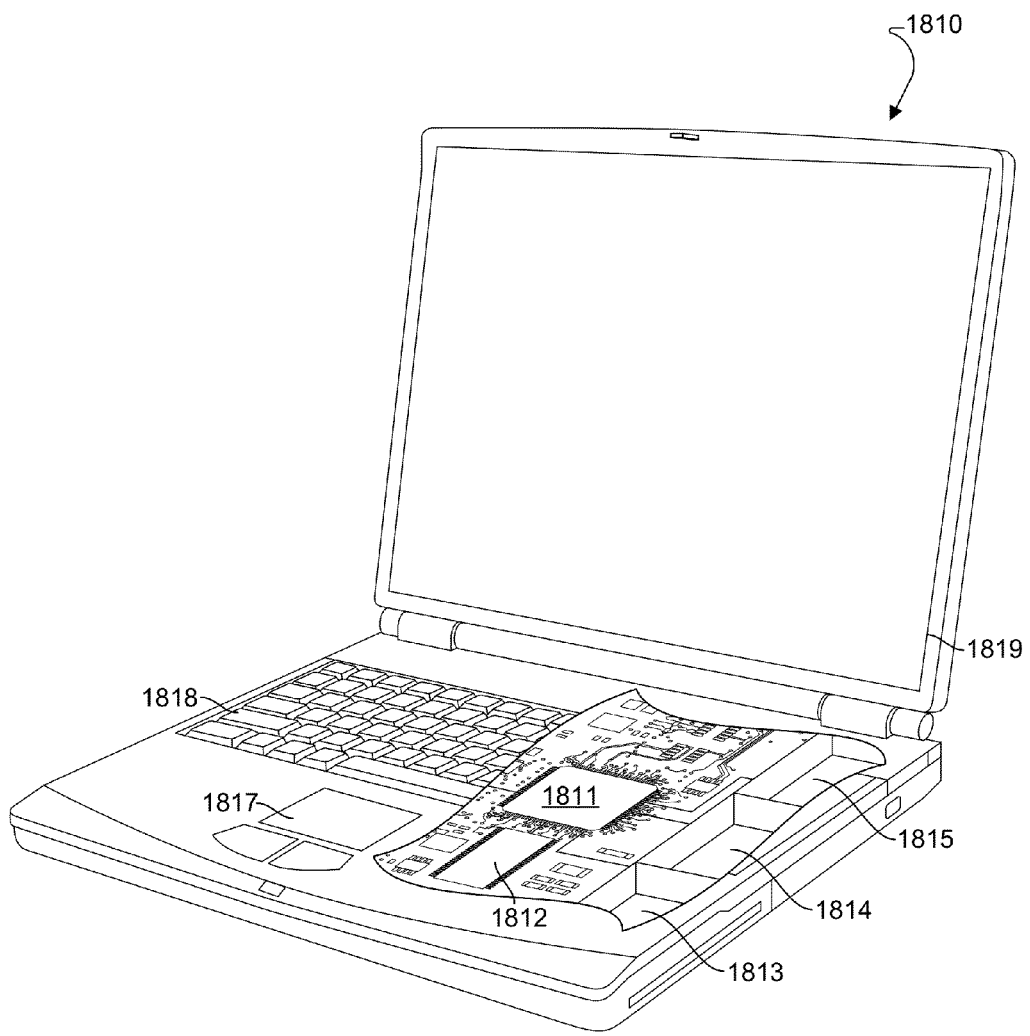
FIG. 18 is a component block diagram of a laptop computer device suitable for use in an embodiment.

FIG. 18 shows a laptop computer 1810. The embodiments described above may also be implemented within a variety of personal computing devices, such as the laptop computer 1810 as illustrated in FIG. 18. The laptop computer 1810 will typically include a processor 1811 coupled to volatile memory 1812 and a large capacity nonvolatile memory, such as a disk drive 1813 of Flash memory. The laptop computer 1810 may also include a compact disc (CD) drive 1814 coupled to the processor 1811. In order to receive wireless broadcasts or multicasts, the computer 1810 may further include a wireless modem 1815 coupled to an antenna (embedded in a portion of a display 1819), with the wireless modem 1815 configured to enable the processor to receive broadcast/multicast transmissions via a wireless network, such as a WiFi or cellular data network. The laptop computer 1810 may also include a number of connector ports coupled to the processor 1811 for establishing data connections or receiving external memory devices, such as a USB or FireWire® connector sockets, or other network connection circuits for coupling the processor 1811 to a network, such as the Internet. In a notebook configuration, the computer housing includes the touchpad 1817, the keyboard 1818, and the display 1819 all coupled to the processor 1811.

As discussed above, the various embodiments may be used for delivering a variety of rich media content, and not just social network web content. Accordingly, the scope of the claims should not be limited to Internet web content delivery and reception unless specifically recited.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium. The steps of a method or algorithm disclosed herein may be embodied in a processor-executable software module executed which may reside on a tangible or non-transitory computer-readable storage medium. Non-transitory computer-readable storage media may be any available storage media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also can be included within the scope of non-transitory computer-readable media. Additionally, the operations of a method or algorithm may reside as one or any combination or set of codes and/or instructions on a non-transitory machine readable medium and/or non-transitory computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for delivering social network updates to a plurality of receiver devices, comprising:
    identifying highly popular entities among one or more social networks by identifying first entities having a number of followers subscribed to receive social network updates posted by the respective first entities exceeding a predetermined threshold;
    obtaining one or more of the social network updates;
    determining whether the one or more of the social network updates is from one of the identified highly popular entities;
    transmitting the obtained social network updates via a unicast network in response to determining the one or more of the social network updates is not from one of the identified highly popular entities; and
    transmitting the obtained social network updates via one of a broadcast network and a multicast network in response to determining the one or more of the social network updates is from one of the identified highly popular entities.

2. The method of claim 1, wherein transmitting the obtained social network updates from the identified highly popular entities via one of the broadcast network and the multicast network comprises broadcasting the obtained social network updates, comprising:
    generating an overhead message communicating broadcast scheduling information identifying each of the obtained social network updates and when each of the obtained social network updates will be broadcast;
    broadcasting the overhead message; and
    broadcasting the obtained social network updates at times identified in the overhead message.

3. The method of claim 1, wherein identifying highly popular entities among the one or more social networks comprises:
    accessing records of a first social network for each of a plurality of entities to determine the number of followers;
    accessing a second social network;
    accessing records of a second social network for each of the plurality of entities to determine the number of followers; and
    identifying from the determined number of followers for each of the accessed records a subset which has more followers than average.

4. The method of claim 1, further comprising:
    receiving in a receiver device the transmitted social network updates via the one of the broadcast network and the multicast network;
    storing the received social network updates in memory of the receiver device; and
    responding to requests for a social network update of a highly popular entity by recalling the requested social network update from the memory of the receiver device.

5. The method of claim 1, further comprising:
    storing the obtained social network updates from the identified highly popular entities in a proxy server positioned near an edge of a wireless communication network; and
    responding to requests for social network updates for highly popular entities from the proxy server without routing the requests to the respective social networks.

6. The method of claim 2, further comprising:
    receiving the overhead message in a receiver device;
    obtaining information identifying each of the obtained social network updates from the received overhead message;
    comparing the information identifying each of the obtained social network updates scheduled for broadcast with social network entities relevant to a user of the receiver device to identify social network updates for reception;
    receiving a broadcast of the identified social network updates based upon scheduling information obtained from the received overhead message;
    storing the received social network updates in memory of the receiver device; and
    responding to requests for a social network update of a highly popular entity by recalling the requested social network update from the memory of the receiver device.

7. The method of claim 6, further comprising:
    determining from the obtained information from the received overhead message whether an identified social network update scheduled for broadcast is stored in the memory of the receiver device; and
    forgoing receiving a broadcast of the identified social network update when it is determined that the identified social network update is stored in the memory of the receiver device.

8. The method of claim 6, further comprising:
    determining from the obtained information from the received overhead message whether an identified social network update scheduled for broadcast is stale; and
    forgoing receiving a broadcast of the identified social network update when it is determined that the identified social network update is stale.

9. The method of claim 6, further comprising determining social network entities relevant to the user of the receiver device by monitoring the user's usage of social networks on the receiver device.

10. The method of claim 6, further comprising registering social network applications implemented on the receiver device with an agent implemented on the receiver device, wherein registration of the social network applications identifies to the agent the social network entities relevant to the user of the receiver device.

11. The method of claim 6, further comprising determining social network entities relevant to the user of the receiver device by receiving messages from the one or more social networks identifying the social network entities relevant to the user.

12. A server, comprising:
   memory; and
   a processor coupled to the memory, wherein the processor is configured with processor executable-instructions to perform operations comprising:
      identifying highly popular entities among one or more social networks by identifying first entities having a number of followers subscribed to receive social network updates posted by the respective first entities exceeding a predetermined threshold;
      obtaining one or more social network updates;
      determining whether the one or more of the social network updates is from one of the identified highly popular entities;
      transmitting the obtained social network updates via a unicast network in response to determining the one or more of the social network updates is not from one of the identified highly popular entities; and
      transmitting the obtained social network updates via one of a broadcast network and a multicast network in response to determining the one or more of the social network updates is from one of the identified highly popular entities.

13. The server of claim 12, wherein the processor is configured with processor executable instructions to perform operations such that transmitting the obtained social network updates from the identified highly popular entities via one of the broadcast network and the multicast network comprises:
   broadcasting the obtained social network updates;
   generating an overhead message communicating broadcast scheduling information identifying each of the obtained social network updates and when each of the obtained social network updates will be broadcast;
   broadcasting the overhead message; and
   broadcasting the obtained social network updates at times identified in the overhead message.

14. The server of claim 12, wherein the processor is configured with processor-executable instructions to perform operations such that identifying highly popular entities among the one or more social networks comprises:
   accessing a first social network;
   accessing records of the first social network for each of a plurality of entities to determine the number of followers;
   accessing a second social network;
   accessing records of the second social network for each of the plurality of entities to determine the number of followers; and
   identifying from the determined number of followers for each of the accessed records a subset which has more followers than average.

15. The server of claim 12, wherein the processor is configured with processor-executable instructions to perform operations further comprising:
   storing the obtained social network updates from the identified highly popular entities in a proxy server positioned near an edge of a wireless communication network, wherein the proxy server is configured to respond to requests for social network updates for highly popular entities from the proxy server without routing the requests to the respective social networks.

16. A system for delivering social network updates to a plurality of computing devices, comprising:
   means for identifying highly popular entities among one or more social networks comprises means for identifying first entities having a number of followers subscribed to receive social network updates posted by the respective first entities exceeding a predetermined threshold;
   means for obtaining one or more of the social network updates;
   means for determining whether the one or more of the social network updates is from one of the identified highly popular entities;
   means for transmitting the obtained social network updates via a unicast network in response to determining the one or more of the social network updates is not from one of the identified highly popular entities; and
   means for transmitting the obtained social network updates via one of a broadcast network and a multicast network in response to determining the one or more of the social network updates is from one of the identified highly popular entities.

17. The system of claim 16, wherein the means for transmitting the obtained social network updates from the identified highly popular entities via one of the broadcast network and the multicast network comprises broadcasting the obtained social network updates, comprising:
   means for generating an overhead message communicating broadcast scheduling information identifying each of the obtained social network updates and when each of the obtained social network updates will be broadcast;
   means for broadcasting the overhead message; and
   means for broadcasting the obtained social network updates at times identified in the overhead message.

18. The system of claim 16, wherein the means for identifying highly popular entities among the one or more social networks comprises:
   means for accessing a first social network;
   means for accessing records of the first social network for each of a plurality of entities to determine the number of followers;
   means for accessing a second social network;
   means for accessing records of the second social network for each of the plurality of entities to determine the number of followers; and
   means for identifying from the determined number of followers for each of the accessed records a subset which has more followers than average.

19. The system of claim 16, further comprising:
   means for storing the obtained social network updates from the identified highly popular entities in a proxy server positioned near an edge of a wireless communication network; and
   means for responding to requests for social network updates for highly popular entities from the proxy server without routing the requests to the respective social networks.

20. A non-transitory processor readable medium having stored thereon processor-executable instructions configured to cause a server processor to perform operations comprising:
   identifying highly popular entities among one or more social networks by identifying first entities having a number of followers subscribed to receive social network updates posted by the respective first entities exceeding a predetermined threshold;

obtaining one or more social network updates;

determining whether the one or more of the social network updates is from one of the identified highly popular entities;

transmitting the obtained social network updates via a unicast network in response to determining the one or more of the social network updates is not from one of the identified highly popular entities; and transmitting the obtained social network updates via one of a broadcast network and a multicast network in response to determining the one or more of the social network updates is from one of the identified highly popular entities.

21. The non-transitory processor readable medium of claim 20, wherein the stored processor-executable instructions are configured to cause the server processor to perform operations and transmitting the obtained social network updates from the identified highly popular entities via one of a broadcast network and a multicast network comprises broadcasting the obtained social network updates, comprising:

generating an overhead message communicating broadcast scheduling information identifying each of the obtained social network updates and when each of the obtained social network updates will be broadcast;

broadcasting the overhead message; and broadcasting the obtained social network updates at times identified in the overhead message.

22. The non-transitory processor readable medium of claim 20, wherein the stored processor-executable instructions are configured to cause the server processor to perform operations and wherein identifying highly popular entities among the one or more social networks comprises:

accessing a first social network;

accessing records of the first social network for each of a plurality of entities to determine the number of followers;

accessing a second social network;

accessing records of the second social network for each of the plurality of entities to determine the number of followers; and identifying from the determined number of followers for each of the accessed records a subset which has more followers than average.

23. The non-transitory processor readable medium of claim 20, wherein the stored processor-executable instructions are configured to cause the server processor to perform operations further comprising:

storing the obtained social network updates from the identified highly popular entities in a proxy server positioned near an edge of a wireless communication network, wherein the proxy server is configured to respond to requests for social network updates for highly popular entities from the proxy server without routing the requests to the respective social networks.

24. A computing device, comprising:

a display;

a memory; and a processor coupled to the display and to the memory and configured with processor executable instructions to perform operations comprising:

receiving one or more social network updates via one of a broadcast network and a multicast network in response to the one or more social network updates being from at least one highly popular entity among one or more social networks having a number of second entities subscribed to receive social network updates posted by the at least one highly popular entity;

receiving one or more social network updates via a unicast network in response to the one or more social network updates not being from the at least one highly popular entity;

storing the received social network updates from the at least one highly popular entity in the memory; and responding to requests for an identified social network update of the at least one highly popular entity by recalling one of the received social network updates from the memory.

25. The computing device of claim 24, wherein the processor is configured with processor-executable instructions to perform operations further comprising:

receiving an overhead message;

obtaining information identifying each of the received social network updates from the received overhead message; and comparing the obtained information identifying each of the received social network updates scheduled for broadcast with social network entities relevant to a user of the computing device to identify the received social network updates for reception;

wherein receiving social network updates via one of the broadcast network and the multicast network comprises receiving a broadcast of the received social network updates based upon scheduling information obtained from the received overhead message.

26. The computing device of claim 25, wherein the processor is configured with processor-executable instructions to perform operations further comprising:

determining from the obtained information from the received overhead message whether an identified social network update scheduled for broadcast is stored in the memory; and forgoing receiving a broadcast of the identified social network update when it is determined that the identified social network update is stored in the memory.

27. The computing device of claim 25, wherein the processor is configured with processor-executable instructions to perform operations further comprising:

determining from the obtained information from the received overhead message whether an identified social network update scheduled for broadcast is stale; and forgoing receiving a broadcast of the identified social network update when it is determined that the identified social network update is stale.

28. The computing device of claim 25, wherein the processor is configured with processor-executable instructions to perform operations further comprising:

determining social network entities relevant to the user of the computing device by monitoring the user's usage of social networks.

29. The computing device of claim 25, wherein the processor is configured with processor-executable instructions to perform operations further comprising:

registering social network applications implemented on the processor with an agent implemented on the processor, wherein registration of the social network applications identifies to the agent the social network entities relevant to the user of the computing device.

30. The computing device of claim 25, wherein the processor is configured with processor-executable instructions to perform operations further comprising determining social network entities relevant to the user of the computing device by receiving messages from the one or more social networks identifying the social network entities relevant to the user.

31. A computing device, comprising:
  means for receiving one or more social network updates via one of a broadcast network and a multicast network in response to the one or more social network updates being from at least one highly popular entity among one or more social networks having a number of second entities subscribed to receive social network updates posted by the at least one highly popular entity;
  means for receiving one or more social network updates via a unicast network in response to the one or more social network updates not being from the at least one highly popular entity;
  means for storing the received social network updates from the at least one highly popular entity in a memory; and
  means for responding to requests for an identified social network update of the at least one highly popular entity by recalling one of the received social network updates from the memory.

32. The computing device of claim 31, further comprising:
  means for receiving an overhead message;
  means for obtaining information identifying each of the received social network updates from the received overhead message; and
  means for comparing the obtained information identifying each of the obtained received social network updates scheduled for broadcast with social network entities relevant to a user of the computing device to identify the received social network updates for reception;
  wherein means for receiving social network updates via one of the broadcast network and the multicast network comprises means for receiving a broadcast of the received social network updates based upon scheduling information obtained from the received overhead message.

33. The computing device of claim 32, further comprising:
  means for determining from the obtained information from the received overhead message whether an identified social network update scheduled for broadcast is stored in the memory; and
  means for forgoing receiving a broadcast of the identified social network update when it is determined that the identified social network update is stored in the memory.

34. The computing device of claim 32, further comprising:
  means for determining from the obtained information from the received overhead message whether an identified social network update scheduled for broadcast is stale; and
  means for forgoing receiving a broadcast of the identified social network update when it is determined that the identified social network update is stale.

35. The computing device of claim 32, further comprising:
  means for determining social network entities relevant to the user of the computing device by monitoring the user's usage of social networks.

36. The computing device of claim 32, further comprising:
  means for registering social network applications implemented on the computing device with an agent implemented on the computing device, wherein registration of the social network applications identifies to the agent the social network entities relevant to the user of the computing device.

37. The computing device of claim 32, further comprising means for determining social network entities relevant to the user of the computing device by receiving messages from the one or more social networks identifying the social network entities relevant to the user.

38. A non-transitory processor readable medium having stored thereon processor-executable instructions configured to cause a processor of a computing device to perform operations comprising:
  receiving one or more social network updates via one of a broadcast network and a multicast network in response to the one or more social network updates being from at least one highly popular entity among one or more social networks having a number of second entities subscribed to receive social network updates posted by the at least one highly popular entity;
  receiving one or more social network updates via a unicast network in response to the one or more social network updates not being from the at least one highly popular entity;
  storing the received social network updates from the at least one highly popular entity in memory; and
  responding to requests for an identified social network update of the at least one highly popular entity by recalling one of the received social network updates from the memory.

39. The non-transitory processor readable medium of claim 38, wherein the stored processor-executable instructions are configured to cause the computing device processor to perform operations further comprising:
  receiving an overhead message;
  obtaining information identifying each of the received social network updates from the received overhead message; and
  comparing the obtained information identifying each of the received social network updates scheduled for broadcast with social network entities relevant to a user of the computing device to identify the received social network updates for reception; and
  wherein receiving social network updates via one of the broadcast network and the multicast network comprises receiving a broadcast of the received social network updates based upon scheduling information obtained from the received overhead message.

40. The non-transitory processor readable medium of claim 39, wherein the stored processor-executable instructions are configured to cause the computing device processor to perform operations further comprising:
  determining from the obtained information from the received overhead message whether an identified social network update scheduled for broadcast is stored in the memory; and
  forgoing receiving a broadcast of the identified social network update when it is determined that the identified social network update is stored in the memory.

41. The non-transitory processor readable medium of claim 39, wherein the stored processor-executable instructions are configured to cause the computing device processor to perform operations further comprising:
  determining from the obtained information from the received overhead message whether an identified social network update scheduled for broadcast is stale; and
  forgoing receiving a broadcast of the identified social network update when it is determined that the identified social network update is stale.

42. The non-transitory processor readable medium of claim 39, wherein the stored processor-executable instructions are configured to cause the computing device processor to perform operations further comprising:

determining social network entities relevant to the user of the computing device by monitoring the user's usage of social networks on the computing device.

43. The non-transitory processor readable medium of claim 39, wherein the stored processor-executable instructions are configured to cause the computing device processor to perform operations further comprising:

registering social network applications implemented on the computing device with an agent implemented on the computing device, wherein registration of the social network applications identifies to the agent the social network entities relevant to the user of the computing device.

44. The non-transitory processor readable medium of claim 39, wherein the stored processor-executable instructions are configured to cause the computing device processor to perform operations, further comprising:

determining social network entities relevant to the user of the computing device by receiving messages from the one or more social networks identifying the social network entities relevant to the user.

45. A system comprising:

a server coupled to one of a broadcast network and a multicast network; and a computing device configured to received communications from the server via one of the broadcast network and the multicast network, wherein the server is configured with processor-executable instructions to perform operations comprising:

identifying highly popular entities among one or more social networks by identifying first entities having a number of followers subscribed to receive social network updates posted by the respective first entities exceeding a predetermined threshold;

obtaining one or more of the social network updates;

determining whether the one or more of the social network updates is from one of the identified highly popular entities;

transmitting the obtained social network updates via a unicast network in response to determining the one or more of the social network updates is not from one of the identified highly popular entities; and transmitting the obtained social network updates via one of the broadcast network and the multicast network in response to determining the one or more of the social network updates is from one of the identified highly popular entities.

46. The system of claim 45, wherein the server is configured to perform operations further comprising:

transmitting the obtained social network updates from the identified highly popular entities via one of the broadcast network and the multicast network comprises broadcasting the obtained social network updates, comprising:

the server generating an overhead message communicating broadcast scheduling information identifying each of the obtained social network updates and when each of the obtained social network updates will be broadcast;

broadcasting the overhead message; and broadcasting the obtained social network updates at times identified in the overhead message.

47. The system of claim 45, wherein the server is configured to perform operations such that identifying highly popular entities among the one or more social networks comprises:

accessing a first social network;

accessing records of the first social network for each of a plurality of entities to determine the number of followers;

accessing a second social network;

accessing records of the second social network for each of the plurality of entities to determine the number of followers; and identifying from the determined number of followers for each of the accessed records a subset which has more followers than average.

48. The system of claim 45, wherein the computing device comprises memory and a processor coupled to the memory, wherein the processor is configured with processor-executable instructions to perform operations comprising:

receiving the transmitted social network updates via the one of the broadcast network and the multicast network;

storing the received social network updates in the memory; and responding to requests for a social network update of at least one highly popular entity by recalling the requested social network update from the memory.

49. The system of claim 48, wherein the processor of the computing device is configured with processor-executable instructions to perform operations further comprising:

receiving an overhead message via the one of the broadcast network and the multicast network;

obtaining information identifying each of the obtained social network updates from the received overhead message;

comparing the information identifying each of the obtained social network updates scheduled for broadcast with social network entities relevant to a user of the computing device to identify social network updates for reception;

receiving a broadcast of the identified social network updates based upon scheduling information obtained from the received overhead message;

storing the received social network updates in the memory; and responding to the requests for the social network update of the at least one highly popular entity by recalling the requested social network update from the memory.

50. The system of claim 48, wherein the computing device is configured to perform operations further comprising:

determining from the obtained information from the received overhead message whether an identified social network update scheduled for broadcast is stored in the memory of the computing device; and forgoing receiving a broadcast of the identified social network update when it is determined that the identified social network update is stored in the memory of the computing device.

51. The system of claim 48, wherein the computing device is configured to perform operations further comprising:

determining from the obtained information from the received overhead message whether an identified social network update scheduled for broadcast is stale; and forgoing receiving a broadcast of the identified social network update when it is determined that the identified social network update is stale.

52. The system of claim 48, wherein the computing device is configured to perform operations further comprising:

determining social network entities relevant to a user of the computing device by monitoring the user's usage of social networks on the computing device.

53. The system of claim 48, wherein the computing device is configured to perform operations further comprising:
registering social network applications implemented on the computing device with an agent implemented on the computing device, wherein registration of the social network applications identifies to the agent social network entities relevant to a user of the computing device.

54. The system of claim 48, wherein the computing device is configured to perform operations further comprising:
determining social network entities relevant to a user of the computing device by receiving messages from the one or more social networks identifying social network entities relevant to the user.

55. The system of claim 45, further comprising a proxy server positioned near an edge of a wireless communication network,
wherein the server is configured to perform operations further comprising storing the obtained social network updates from the identified highly popular entities in the proxy server, and
wherein the proxy server is configured to perform operation comprising responding to requests for social network updates for highly popular entities from the proxy server without routing the requests to the respective social networks.

* * * * *